(12) United States Patent
Ogawa

(10) Patent No.: US 7,395,397 B2
(45) Date of Patent: Jul. 1, 2008

(54) ELECTRONIC APPARATUS WITH PAGE TABLE MANAGEMENT OF PROGRAM, DATA PROCESSING METHOD AND COMPUTER PROGRAM

(75) Inventor: Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 11/304,242

(22) Filed: Dec. 15, 2005

(65) Prior Publication Data

US 2006/0173925 A1      Aug. 3, 2006

(30) Foreign Application Priority Data

| Dec. 24, 2004 | (JP) | ............................. 2004-374386 |
| Dec. 24, 2004 | (JP) | ............................. 2004-374765 |
| Apr. 25, 2005 | (JP) | ............................. 2005-126957 |

(51) Int. Cl.
 *G06F 12/00*   (2006.01)
 *G06F 9/445*   (2006.01)
 *H04N 5/232*   (2006.01)

(52) U.S. Cl. ...................................... 711/165; 711/206

(58) Field of Classification Search ....................... None
See application file for complete search history.

(56) References Cited

U.S. PATENT DOCUMENTS

| 5,594,903 | A | * | 1/1997 | Bunnell et al. | ............... 717/162 |
| 5,617,552 | A | * | 4/1997 | Garber et al. | ................... 711/1 |
| 5,699,539 | A | * | 12/1997 | Garber et al. | ................... 711/2 |
| 5,940,871 | A | * | 8/1999 | Goyal et al. | ................ 711/206 |
| 6,804,766 | B1 | * | 10/2004 | Noel et al. | ................... 711/203 |
| 2005/0050295 | A1 | * | 3/2005 | Noel et al. | ................... 711/206 |

* cited by examiner

*Primary Examiner*—Kevin Verbrugge
(74) *Attorney, Agent, or Firm*—Cowan, Liebowitz & Latman, P.C.

(57) ABSTRACT

An electronic apparatus executes a program by using a page table for managing, on a page unit basis, virtual and physical addresses of the program recorded in a first recording medium. The page table is set in such a manner that a physical address is unassigned to a designated area of the program stored in the first recording medium. When the area unassigned with the physical address is accessed during execution of the program, data of the program corresponding to the accessed physical address is copied from the first recording medium to a second recording medium.

14 Claims, 28 Drawing Sheets

301

```
100: void InitializeMyModule (void)
101: {
102:    CreateShadow (MyFirstFunc, (char*) EndModule-(char*) MyFirstFunc) ;
103: }
104:
105: void MyFirstFunc (void)
106: {
107:    :
108: }
109: void MyFunc (void)
110: {
111:    :
112: }
113: static void EndModule (void)
114: {
115: }
```

```
100:   static int fFirstAccess = TRUE;
101:   static int Count;
102:
103:   void MyFunction (void)
104:   {
105:       if (fFirstAccess) {
106:           FirstFunction ();
107:           fFirstAccess = FALSE;
108:       }
109:       Count++;
110:       return;
111:  }
```

```
0001: _DATA      SEGMENT
0002:     _fFirstAccess DD 01H
0003: _DATA      ENDS
0004: PUBLIC     _MyFunction
0005: EXTRN      _FirstFunction:NEAR
0006: _BSS       SEGMENT
0007:     _Count DD 01H DUP (?)
0008: _BSS       ENDS
0009: _TEXT      SEGMENT
0010: _MyFunction PROC NEAR
0011:    push     ebp
0012:    mov      ebp, esp
0013:    cmp      DWORD PTR _fFirstAccess, 0
0014:    je       SHORT $L34
0015:    call     _FirstFunction
0016:    mov      DWORD PTR _fFirstAccess, 0
0017: $L34:
0018:    mov      eax, DWORD PTR _Count
0019:    add      eax, 1
0020:    mov      DWORD PTR _Count, eax
0021:    mov      eax, DWORD PTR _Count
0022:    pop      ebp
0023:    ret      0
0024: _MyFunction ENDP
0025: _TEXT      ENDS
0026: END
```

US 7,395,397 B2

ELECTRONIC APPARATUS WITH PAGE TABLE MANAGEMENT OF PROGRAM, DATA PROCESSING METHOD AND COMPUTER PROGRAM

BACKGROUND OF THE INVENTION

1. Field of the Invention

The present invention relates to data processing for starting up an electronic apparatus.

2. Related Background Art

In the field of digital camera and the like, large scale software including Graphical User Interface (GUI) using a Windows system is stored in a read only memory (ROM) and executed. Such a system is required to drive a 32-bit reduced instruction set computer (RISC) processor and a large capacity dynamic random access memory (DRAM) by using a compact battery.

It is therefore usual to turn off completely the power source when the apparatus is not used, and to turn on immediately before the apparatus is used. In the case of a digital camera, the time taken to start to use the camera after the power is turned on is preferably as short as possible in order not to lose a photographing chance. It is therefore desired to realize a computer system having a short system start-up time. The system start-up time includes a time taken to initialize an operating system (OS) and drivers and a time taken to transfer initial values of data segments of a high-level language such as a C language. This start-up time is required before initialization during operational procedure of the digital camera, and is called overhead. Prior art of activating a high-level language from ROM is described in Japanese Patent Application Laid-Open No. 2004-348677.

In order to implement a ROM program using a high-level language, typically a C language, initialization is required to allow the high-level language to operate. There is a tendency that the time taken to set initial values in variable areas becomes long as the program scale becomes large. These variables are called "static variables with initialization" in the C language. The variable area is called a data segment and assigned to a predetermined address of a RAM by a programmer.

Initial values are written in ROM at predetermined addresses, and copied from ROM to data segments of RAM by a start-up routine of the C language. In the C language specifications, static variables whose initial values are not assigned are initialized to 0. These static variables are developed into a RAM area called a BSS area. In addition to transfer of initial values from ROM to RAM, a process of changing variables developed into the BSS area to 0 s (0-clear) takes a time during the start-up.

High speed processing by CPU is required in many cases, such as GUI expression using many animations, file compression by software, and image processing for printing.

Speed Difference Between ROM and RAM

A clock of a RISC processor tends to increase year after year, and high speed operations at 100 Mhz or 200 Mhz are not rare. However, an access speed of ROM is very slow as about 120 ns, as compared to a processor speed. In order to make compact a camera, not a 32-bit bus but a 16-bit bus is used for connection so that it is not rare that about 300 ns is taken to fetch one machine instruction.

A read speed of RAM such as an SDRAM is very fast as compared to a fetch command from ROM, because burst read is possible. In such a system, a cache memory exists between CPU and a memory. Therefore, read/write between DRAM and cache is performed always in a burst mode so that a fetch can be executed in average at twice to several times (10 to several tens ns) the internal speed. Namely, when the cache mishits, data can be read at high speed from RAM at about ten times the speed of reading it from ROM.

Under these circumstances, all programs in ROM are often copied once to RAM. However, since all programs in ROM are required to be copied to RAM upon start-up, there arises a problem that the start-up time becomes very long, several hundreds ms to several tens sec. This approach is therefore not suitable for an apparatus required to shorten the start-up time, such as a digital camera.

It is difficult to shorten the time taken to copy initial values of variables from ROM to RAM, this time occupying a large part of the start-up time. This time is approximately several hundreds ms. During this time, the computer system can execute neither effective user programs nor OS initialization.

From the same reason, a basic input/output system (BIOS) of a personal computer is also copied to RAM to execute it. For example, a BIOS system has been devised such as described in Japanese Patent Application Laid-Open No. 2001-51858. This system is generally called a "shadow BIOS" and realized by transferring a drawing routine and the like in BIOS to RAM. The shadow BIOS is operated by disposing RAM at an address of an original ROM by using functions of a memory management unit (MMU). However, similar to the techniques described above, the techniques of the shadow BIOS are not suitable for a digital camera, because a transfer to RAM is explicitly executed during start-up.

According to conventional techniques described above, it is difficult to properly shorten a start-up time of an electronic apparatus such as a digital camera executing large scale software implemented in ROM.

SUMMARY OF THE INVENTION

The present invention solves the above-described problems, and an object of the present invention is to provide an electronic apparatus capable of considerably shortening a start-up time, and provide a data processing method and a computer program.

An electronic apparatus of the present invention, as a means for achieving the object, for executing a program by using a page table for managing, on a page unit basis, virtual and physical addresses of the program recorded in a first recording medium, comprises: a setting unit, which sets the page table in such a manner that a physical address is unassigned to a designated area of the program stored in the first recording medium; and a copying unit, which copies, when the area unassigned with the physical address is accessed during execution of the program, data of the program corresponding to the accessed physical address from the first recording medium to a second recording medium.

BRIEF DESCRIPTION OF THE DRAWINGS

The above object of the present invention will become apparent from the following description taken in conjunction with the accompanying drawings.

FIG. 11 is a diagram showing an example of an assembler list written with a C language according to a second embodiment of the present invention.

FIG. 12 is a diagram showing an example of an assembler list according to the second embodiment of the present invention.

DESCRIPTION OF THE PREFERRED EMBODIMENTS

Next, embodiments of the present invention will be described with reference to the accompanying drawings.

First Embodiment

First, description will be made on the first embodiment of the present invention.

MMU

The integration degree of large scale integration (LSI) devices has been increased recently, and it becomes possible to mount a memory management unit (MMU) or a system on chip (SOC) having built-in hardware. As will be later described, this embodiment utilizes technologies of paging hardware. First, paging hardware will be described.

Virtual Storage

The essential object of paging hardware is to realize virtual storage which can expand a main memory by using an external storage. The paging hardware exists and operates between a processor and a memory, divides the address space of a program into pages having a fixed size (e.g., 4 KB, 8 KB) to divide the physical address of a computer into page frames having the same size.

Figure 1:
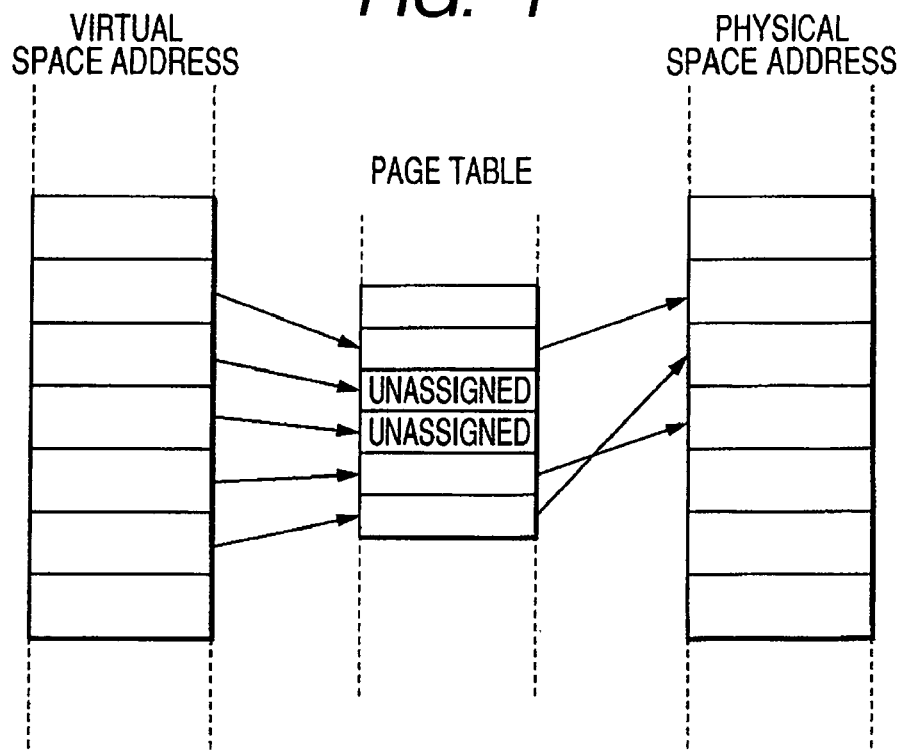
FIG. 1 is a diagram showing an example of the concept of a page table according to a first embodiment of the present invention.

The paging hardware has a page table such as shown in FIG. 1 having one entry per one page of an address space. Stored in this page table entry is a physical address of an actual page frame corresponding to a subject page or a flag indicating that a subject page does not exist (page frame is not assigned).

If the processor addresses the page not existing (unassigned page frame), a page fault interrupt occurs. A program for processing a page fault interrupt reads the contents in a corresponding external storage to the main memory to assign as a frame, and thereafter returns the control to resume the original program. By assigning the contents of the external storage having a high usage frequency to the main memory by using a least recently used (LRU) algorithm, an application can operate as if there is a larger memory than the actually existing main memory. The details are explained in "Fundamentals and Applications of OS" by A. S. Tanenbaum, published by Peason Education Japan (translated from "Modern Operating System", published by Prentice Hall, Inc.) and in other documents.

Position Dependent

A program compiled into machine words is generally characterized by position dependent. This means that if the address at the program is moved, the program will not operate correctly. Therefore, it is not possible to transfer a portion of a program in a ROM to RAM and execute it. A program independent from a position and inexecutable by itself is called a relocatable object.

The relocatable object contains redundant information for changing a program in an executable state, in accordance with the position when the position is decided. A program called a loader or a relocator is used to change the relocatable object in an executable state. It takes a long time for such a program to develop a subject program into RAM. The process to be executed by this program is a large load if it is executed during start-up of a digital camera.

Application of MMU

In this embodiment, attention is paid to the characteristics of virtual addresses of MMU. Even if a program has the same position as viewed from CPU in a software manner, RAM is physically assigned to develop only a portion of the program in ROM into RAM and realize high speed program execution.

Shadow Assign at Requested Time

In this embodiment, instead of transferring a program from ROM to RAM during start-up, only a portion which becomes necessary during application execution, i.e., only a portion to be actually executed, is transferred to RAM to realize high speed program execution.

Digital Camera

Figure 2:
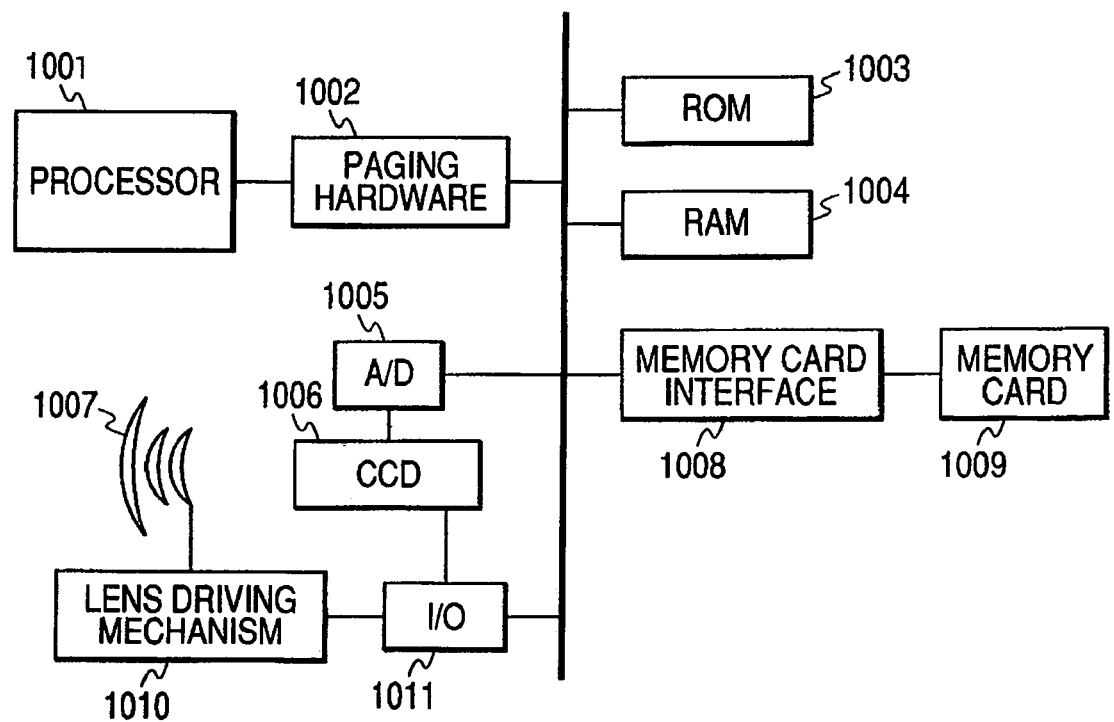
FIG. 2 is a diagram showing an example of the hardware structure of a digital camera according to the first embodiment of the present invention.

FIG. 2 is a diagram showing an example of the hardware structure of a digital camera according to the first embodiment of the present invention. In FIG. 2, a processor 1001 reads and executes a program. Paging hardware 1002 manages virtual addresses and physical addresses. A ROM 1003 stores a program for the digital camera. A RAM 1004 stores images and variables. An A/D converter 1005 is used for receiving photographed images. A charge-coupled device (CCD) 1006 receives light incident upon a lens 1007 and converts it into an electric signal. The lens 1007 focuses an image on CCD 1006. An interface 1008 is used for connection to a memory card 1009 which stores images. An I/O interface 1011 is used for driving peripheral circuits. A lens drive mechanism 1010 drives the lens 1007.

As a power source is turned on, the processor 1001 reads via the paging hardware 1002 an instruction of the program stored in ROM 1003 at an address called a reset vector, and starts executing the instruction. The paging hardware 1002 is in an initial state immediately after reset, and physical and virtual addresses are identical to each other in the initial state. The process of photographing an image and recording it in the memory card 1009 does not concern about the essential contents of the embodiment, so that the description thereof is omitted.

Initial State

Figure 3:
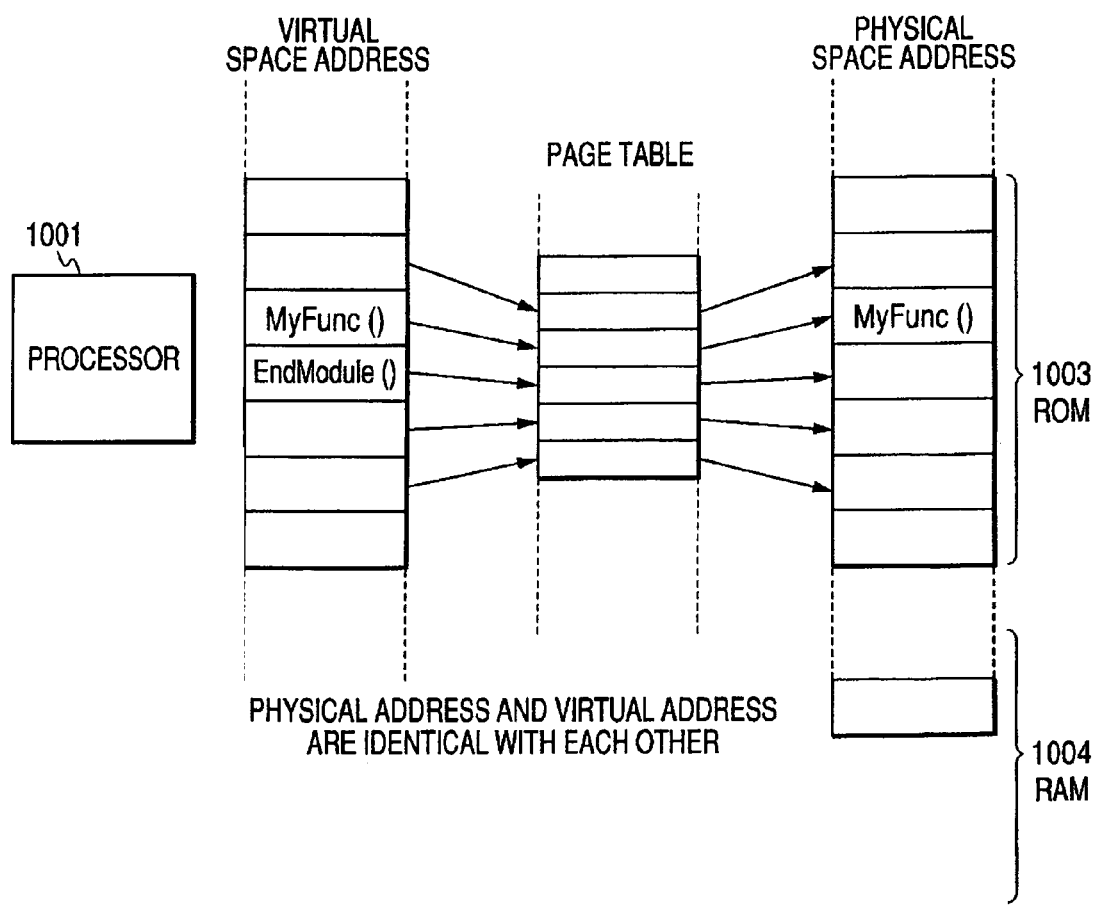
FIG. 3 is a diagram showing an example of the state of paging hardware, a ROM and a RAM immediately after the system of the digital camera is activated, according to the first embodiment of the present invention.

FIG. 3 is a diagram showing an example of the state of paging hardware 1002, ROM 1003 and RAM 1004 immediately after the system of the digital camera of the embodiment is activated. As shown in FIG. 3, in the state immediately after the system is activated, physical addresses are assigned to all virtual addresses.

Application Program

Figures 4, 5:
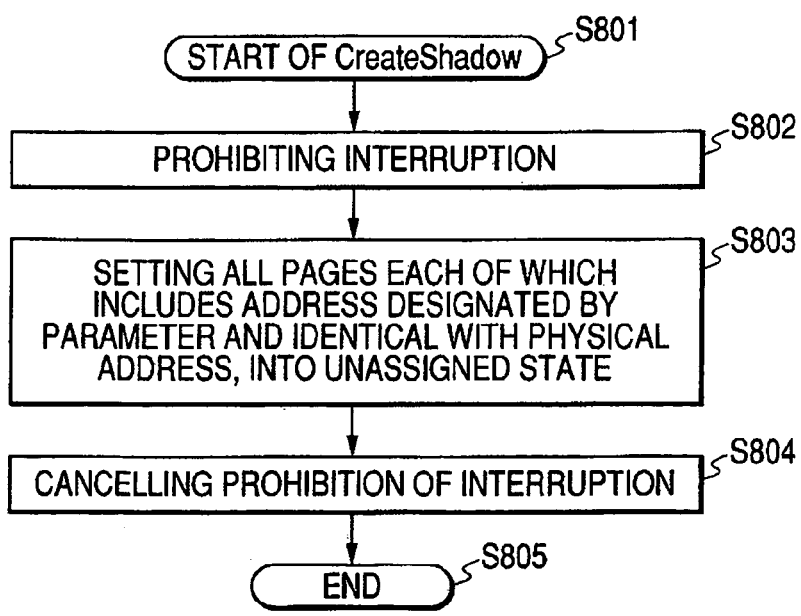
FIG. 4 is a diagram showing source codes as an example of an application program according to the first embodiment of the present invention.
FIG. 5 is a flow chart illustrating an example of the operation of a function CreateShadow according to the first embodiment of the present invention.

FIG. 4 is a diagram showing source codes written by a C language as an example of an application program. A row #100 of a program 301 shown in FIG. 4 is a first function for calling this program 301. The program 301 may not be a program called when the system is activated, but may be a program when a module is used. For example, if a module is a printing module, the program may be called only when a printer is connected.

A row #102 calls a function CreateShadow for creating a shadow, which is one of characteristics programs of the embodiment. Parameters of this function CreateShadow are a start address and a size. An address of the function at a row #105 is designated as the start address. In order to obtain the size, an address difference is calculated between a function EndModule at a row #113 and the function MyFirstFunc at the row #105.

FIG. 5 is a flow chart illustrating an example of the operation to be executed by the function CreateShadow called at the row #102 of the program 301 shown in FIG. 4. In FIG. 5, first the process starts at Step S801 and an interrupt is prohibited at Step S802. At Step S803, a page memory is set so that all pages which include the address designated by the parameter of the function CreateShadow and identical with the physical address, are set into an unassigned state. At Step S804, the interrupt prohibition is released or canceled to terminate the process at Step S805.

Figure 6:
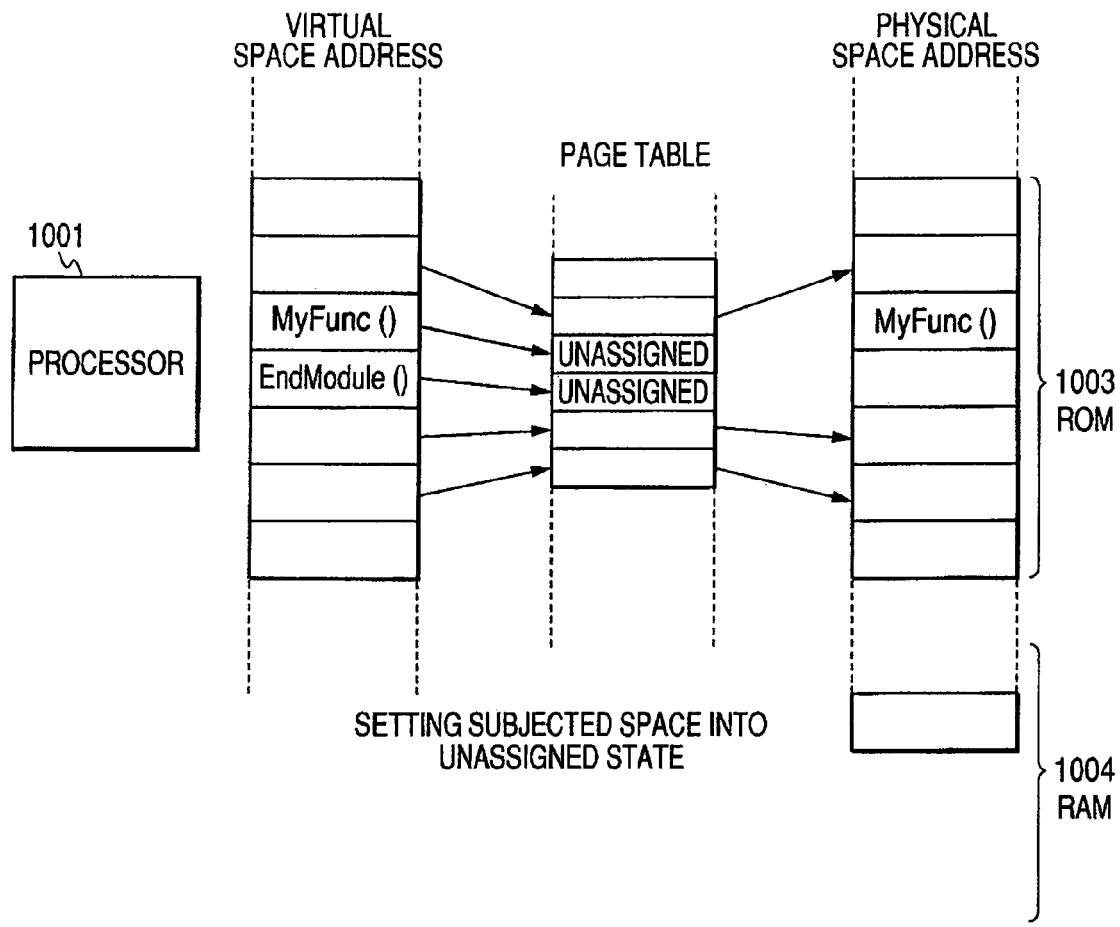
FIG. 6 is a diagram showing an example of the state of paging hardware, ROM and ROM when the operation of the function CreateShadow is completed, according to the first embodiment of the present invention.

When the process at Step S805 shown in FIG. 5 is completed, i.e., when the row #102 of the program 301 shown in FIG. 4 is executed completely, the state of paging hardware 1002, ROM 1003 and RAM 1004 is as shown in FIG. 6. All pages including the functions from the function MyFirstFunc to the function EndModule are set into the unassigned state. It can be understood from FIG. 6 that the physical address of a function MyFunc is in the unassigned state.

Next, as the function MyFunc at a row #109 of the program 301 shown in FIG. 4 is called, a page fault interrupt is generated. With reference to the flow chart shown in FIG. 7, description will be made on an example of a page fault interrupt process. The interrupt process starts at Step S901 shown in FIG. 7, and a blank frame is secured at Step S902. At Step S903, the contents of a subjected page of ROM 1003 are copied to the blank frame secured at Step S902. FIG. 8 is a diagram showing an example of the state of paging hardware 1002, ROM 1003 and RAM 1004 at a time when the contents of the subjected page of ROM 1003 are copied to the blank frame. It can be seen from FIG. 8 that a copy of the function MyFunc is formed in the frame of RAM 1004.

Figure 7:
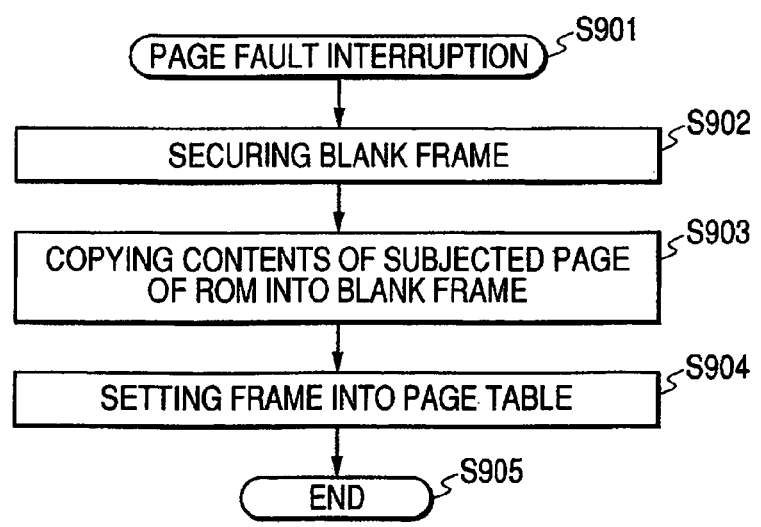
FIG. 7 is a flow chart illustrating an example of a page fault interrupt process according to the first embodiment of the present invention.
Figure 8:
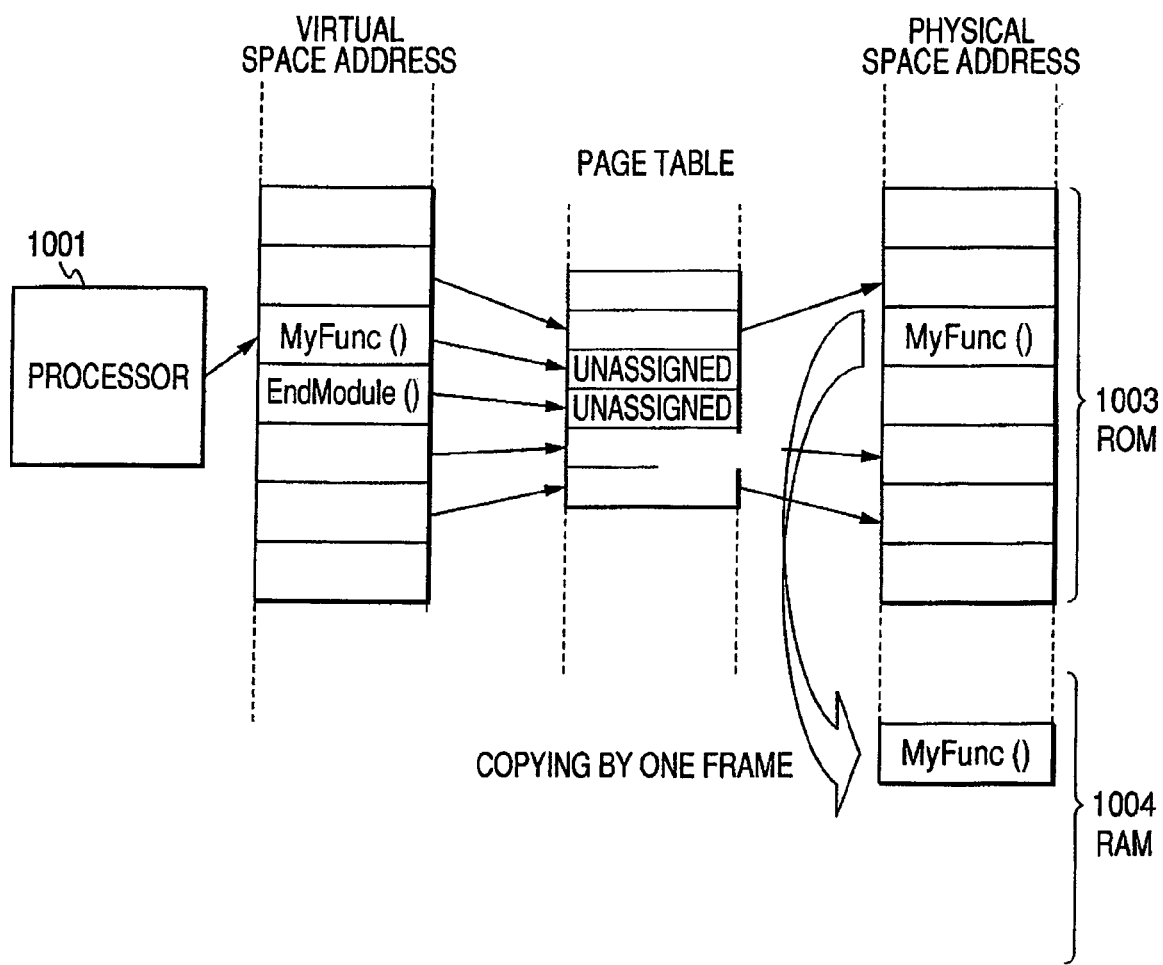
FIG. 8 is a diagram showing an example of the state of paging hardware, ROM and ROM when contents in ROM are copied to a blank frame according to the first embodiment of the present invention.
Figure 9:
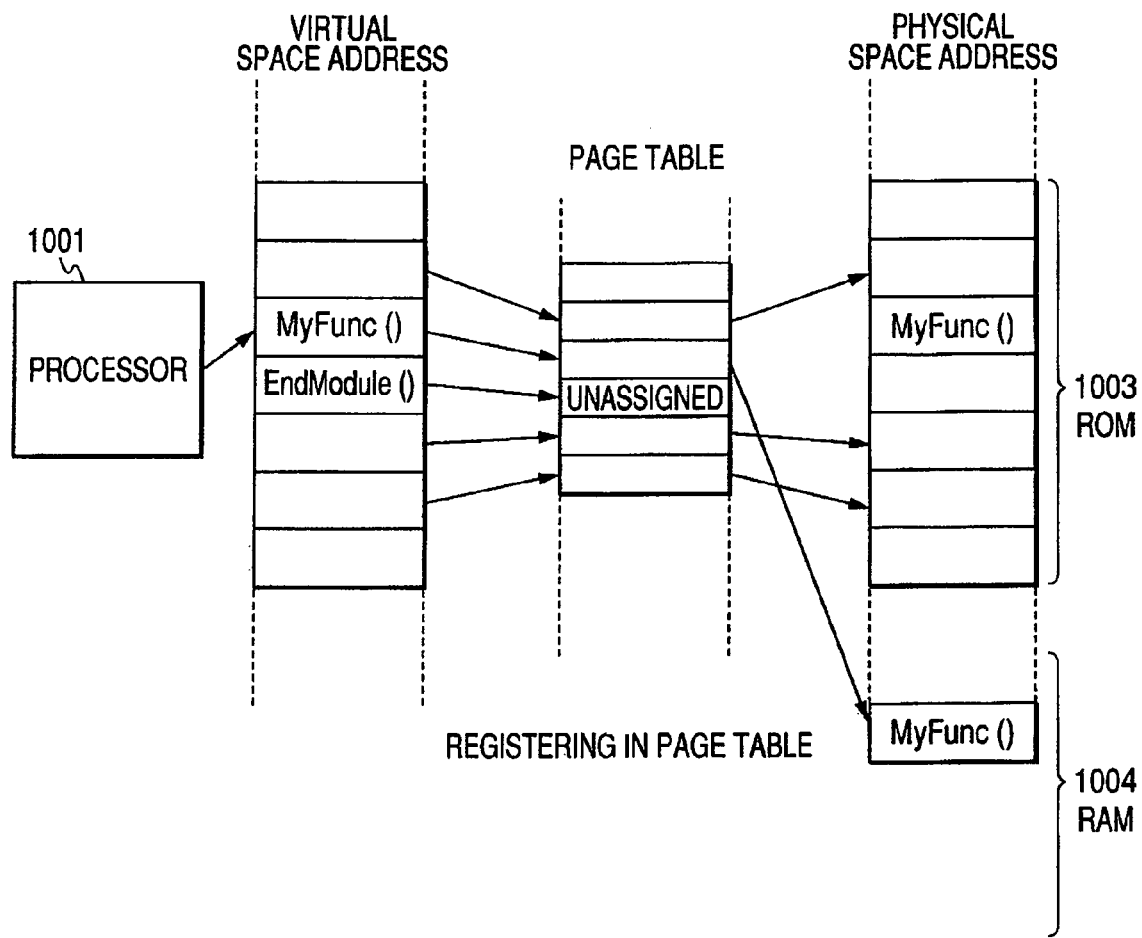
FIG. 9 is a diagram showing an example of the state of paging hardware, ROM and ROM when a frame is assigned to a page table according to the first embodiment of the present invention.

After the contents of the subjected page of ROM 1003 are copied to the blank frame, a frame is set to the page table at Step S904 shown in FIG. 7. FIG. 9 is a diagram showing an example of the state of paging hardware 1002, ROM 1003 and RAM 1004 at a time when the frame is assigned to the page table. Since the program copied to RAM 1004 is read from the same virtual address as the original address, even a position dependent program can be executed. The page fault interrupt is terminated at Step S905.

After returning from the page fault interrupt described above, the program 301 resumes to execute the row #109 shown in FIG. 4. In this case, the program 301 itself is fetched from RAM 1004 so that high speed read is possible. As the row #109 of the program 301 shown in FIG. 4 is executed again, a page fault interrupt will not be generated because the frame is already assigned.

Figure 10:
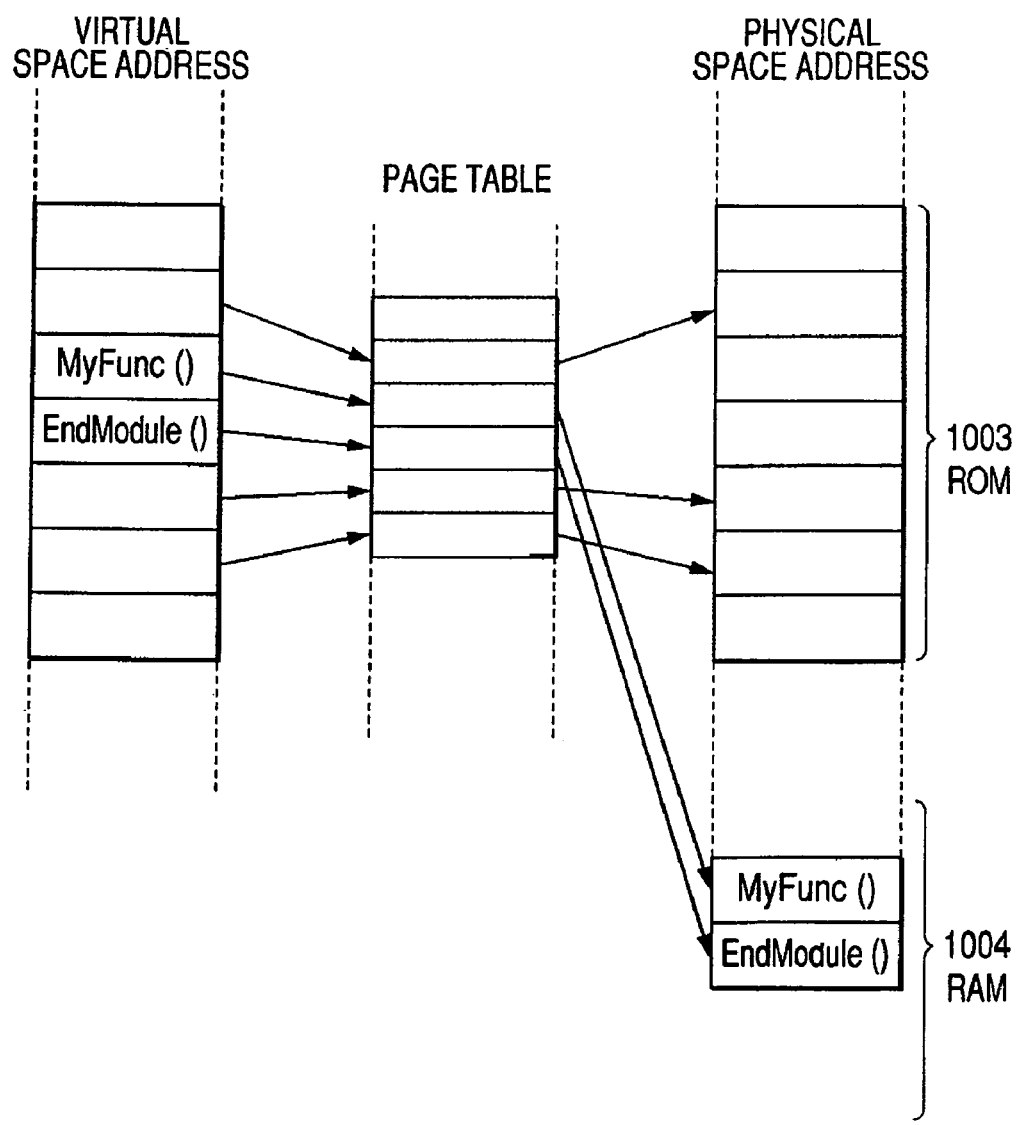
FIG. 10 is a diagram showing an example of the state of paging hardware, ROM and ROM when a frame is assigned to a page table according to the first embodiment of the present invention.

FIG. 10 is a diagram showing an example of the state of paging hardware 1002, ROM 1003 and RAM 1004 when a frame is assigned by executing the above-described process for the page including the function EndModule.

With the above-described arrangement, there is no loss of a wait time for transferring a program from ROM 1003 to RAM 1004 during system start-up. Further, a portion of a position dependent program can be developed into RAM 1004. Accordingly, a computer system can be configured which realizes easily the execution of a portion of a large scale ROM program by RAM 1004 capable of executing a program at high speed.

The main portion constituting a start-up time of digital cameras among others includes a long wait time of the processor (CPU) 1001, such as moving the lens 1007 to an initial position and reading data from the memory card 1009. Graphical user interface (GUI) using a Windows system and the like consumes a long process time of the processor (CPU) 1001, and is a program operating not at all during start-up. Therefore, it is efficient to transfer an application program from ROM 1003 to RAM 1004 when the application program is requested, i.e., when the application program is to be executed. With this arrangement, a time taken to transfer an application program from ROM 1003 to RAM 1004 during start-up can be saved and the program required to operate at high speed can be developed into RAM 1004 to execute it.

Second Embodiment

Next, the second embodiment of the present invention will be described. In the description of the second embodiment, similar elements to those of the first embodiment shown in FIGS. 1 to 10 are represented by using identical reference symbols, and the detailed description thereof is omitted.

Data Segment Copy at Requested Time

Similar to the first embodiment, also in the second embodiment, paging hardware is used. By shortening the time necessary for initializing variables during start-up of a computer language, a framework for built-in software is provided which can operate at high speed.

An initializing program, which is a first program to be cold-started after a power-on reset is released, starts operating to initialize the page table of the paging hardware. In this case, it is set in such a manner that the page frame is not assigned to the areas of a data segment and BSS.

A variable initializing routine of the computer language is skipped to jump to an entry point of the first program of the computer language in the state that variables are not initialized. As the program written in the computer language accesses a static variable, a page fault occurs so that the page fault interrupt program is called and activated. A page frame is assigned to the page where the page fault occurred. If the page where the page fault occurred is a BSS area, the contents of the memory in the page frame are initialized to 0, and the control is returned to the original program. If the page where the page fault occurred is a data segment area, initial values are copied from an area of ROM corresponding to the memory page frame, and the control is returned to the original program. This embodiment is realized by using such programs. The details of the embodiment will be described with reference to the accompanying drawings.

The hardware structure of a digital camera is, for example, the same as that of the first embodiment described above. As a power source is turned on, the processor 1001 reads and starts executing an instruction at an address, called a reset vector of the program, stored in ROM 1003, similar to the first embodiment described above. The paging hardware 1302 is in the initial state immediately after reset, and physical addresses are identical with virtual addresses, similar to the first embodiment described above. The process of photographing an image and recording it in the memory card 1009 does not concern about the essential contents of the embodiment, so that the description thereof is omitted.

Variable

FIG. 11 is a diagram showing an example of a program written by a C language. FIG. 12 is a diagram showing an example of an assembler list obtained by compiling the program 1101 shown in FIG. 11. In the program 1101 shown in FIG. 11, a row #100 shows a variable with initialization, which means that a value "TRUE" is already substituted to a variable "fFirstAccess" when the program 1101 starts.

The variable "fFirstAccess" is written in a row #0002 of the assembler list 1201 shown in FIG. 12. An area from a row #0001 to a row #0003 is a data segment area. The data segment of this program 1101 is only "fFirstAccess" after compile. However, since data segments of all programs are collected in one area by a linker, variables having different modules written by a plurality of sources exist adjacent to each other in the data segment.

Although a variable "Count" is declared in a row #101 of the program 1101 shown in FIG. 11, an initial value is not substituted. Since the specifications of the C language define that the variable whose initial value is not declared is initialized to 0, the initial value of "Count" should be 0. A row #0007 of the assembler list 1201 shown in FIG. 12 is the compile result of "Count". Since a BSS area is from a row #0006 to a row #0008 of the assembler list 1201 shown in FIG. 12, it can be understood that "Count" is compiled as the variable of the BSS area. Similar to the data segments, the BSS areas are collected by the linker so that variables of a plurality of modules exist adjacent to each other.

Conventional Start-up

Figure 13:
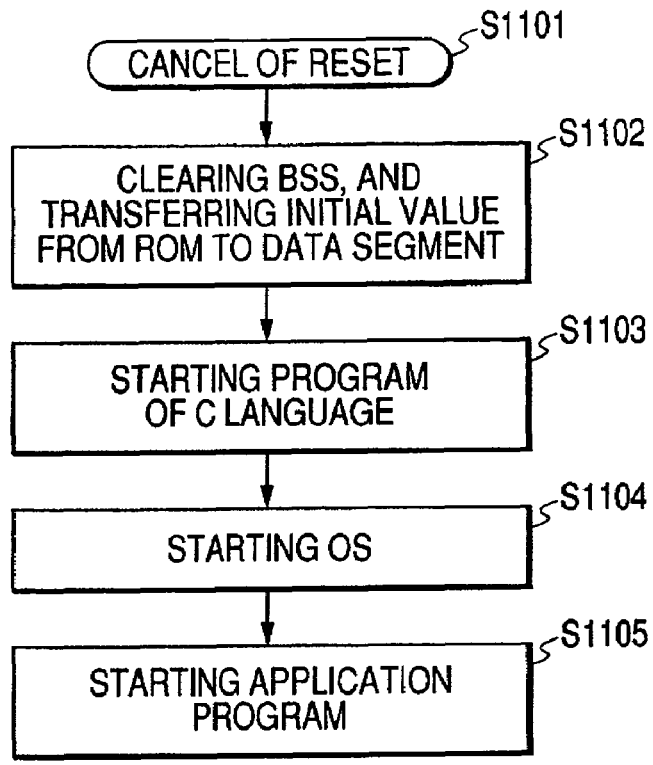
FIG. 13 is a flow chart illustrating a conventional start-up operation.

Prior to describing the start-up of this embodiment, a conventional start-up will be described again. FIG. 13 is a flow chart illustrating a conventional start-up. As the reset is released or canceled at Step S1101, 0 s are written in the BSS area at Step S1102, and initial values are transferred from ROM to data segments. At Step S1103 a program of the C language starts being executed. At Step S1104, an OS as a program of the C language starts. As the OS is activated, at Step S1105 an application program starts. The operation of the digital camera can start from Step S1105. There is a time loss of several hundreds ms from Step S1101 to Step S1105.

Embodiment Start-Up

Figure 14:
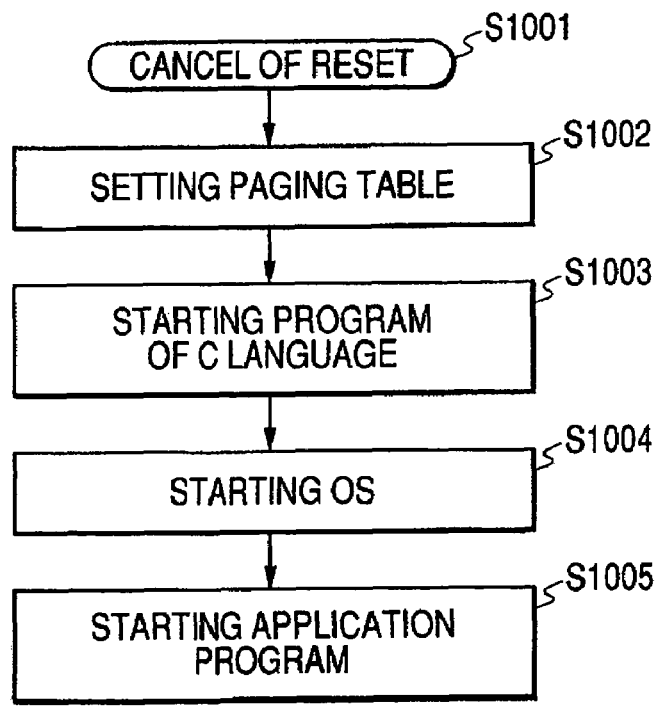
FIG. 14 is a flow chart illustrating a start-up operation according to the second embodiment of the present invention.

With reference to the flow chart shown in FIG. 14, description will be made on an example of the start-up operation of this embodiment. As the reset is released at Step S1001, the page table in the paging hardware 1002 shown in FIG. 2 is set at Step S1002. In this case, it is set in such a manner that physical addresses are not assigned to the areas of data segment and BSS areas. The C language starts at Step S1003, an OS starts at Step S1004, and an application program starts at Step S1005.

Description of Execution Operation

Figure 15:
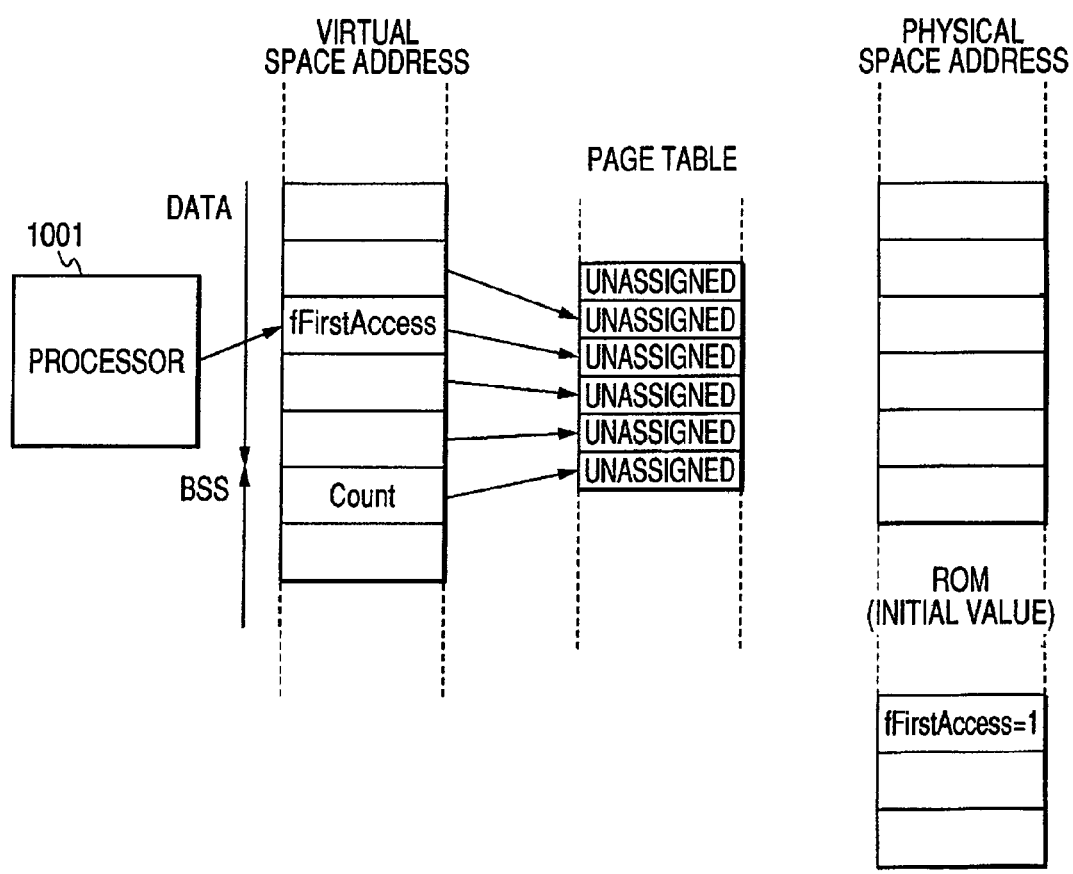
FIG. 15 is a diagram showing the state that physical addresses are unassigned to a variable area of a page table according to the second embodiment of the present invention.

Description will be made on how the application program is executed at Step S1005 in the flow chart shown in FIG. 14, by using the program 1101 shown in FIG. 11 by way of example. The application program is executed from a row #103 of the program 1101 shown in FIG. 11. An effective row to be first executed is a row #105. The row #105 is a branch routine indicating that if the variable "fFirstAccess" is true, a row #106 is executed, whereas if it is false, a row #108 is executed. By executing the row #105, the value of the variable "fFirstAccess" declared at the row #100 is read. FIG. 15 is a diagram showing the state that the processor 1001 addresses the variable "fFirstAccess". Step S1002 shown in FIG. 14 does not assign the physical space to the data segment area and BSS area of the page table. If the address unassigned with physical space is addressed, a page fault interrupt occurs. As the page default interrupt occurs, the program is activated.

Page Fault Process

With reference to the flow chart shown in FIG. 16, description will be made on an example of the operation to be executed by the program activated upon occurrence of page fault interrupt. First, a page fault interrupt occurs at Step S1201 and the program is activated. At Step S1202, a physical memory still not assigned is secured. At Step S1203 it is judged whether the page where the page fault occurred is a data segment, a BSS or a mixture of the data segment and BSS. Since the row #105 of the program 1101 shown in FIG. 11 is executed, the variable "fFirstAccess" is a data segment so that the flow branches to Step S1204 whereat an initial value is transferred from ROM 1303 at a corresponding address.

Figure 17:
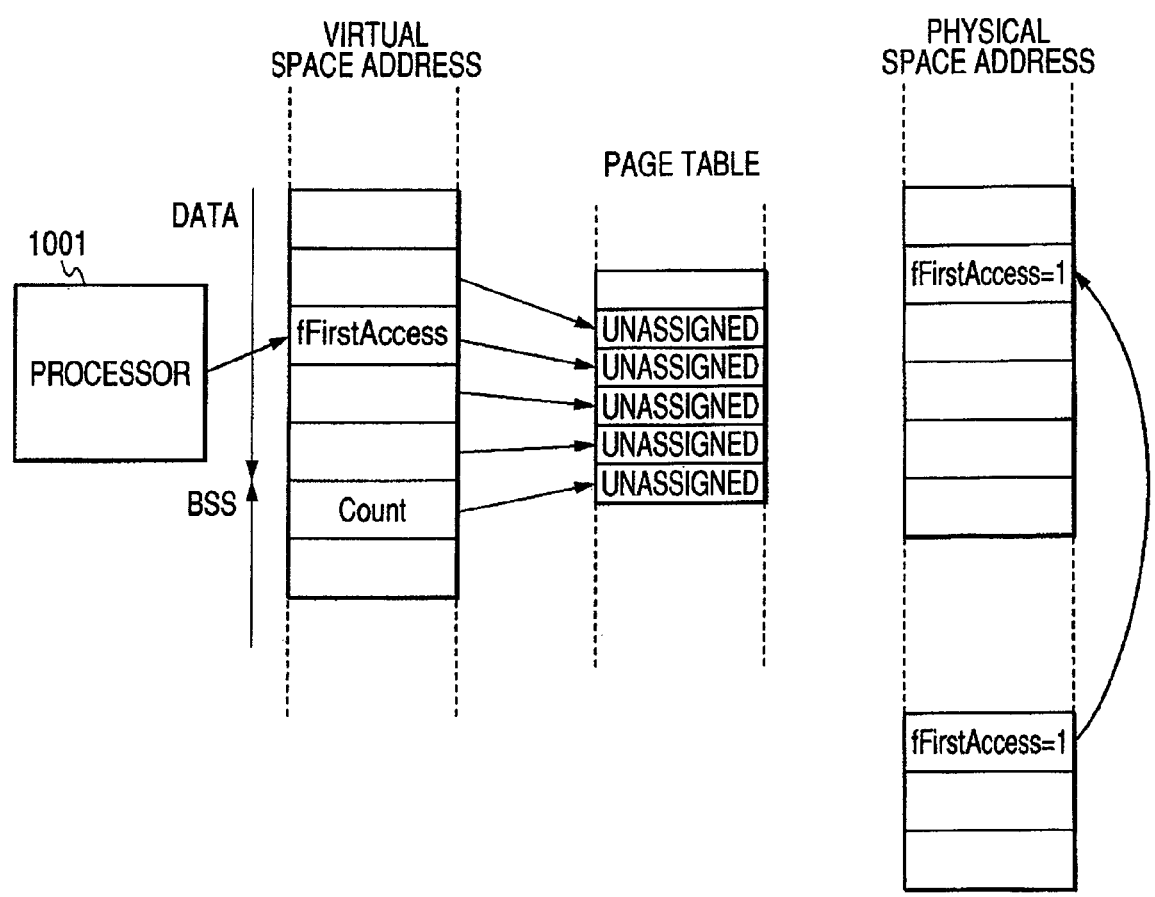
FIG. 17 is a diagram showing an example of the state that initial values of variables stored in ROM are transferred to RAM at physical addresses according to the second embodiment of the present invention.
Figure 18:
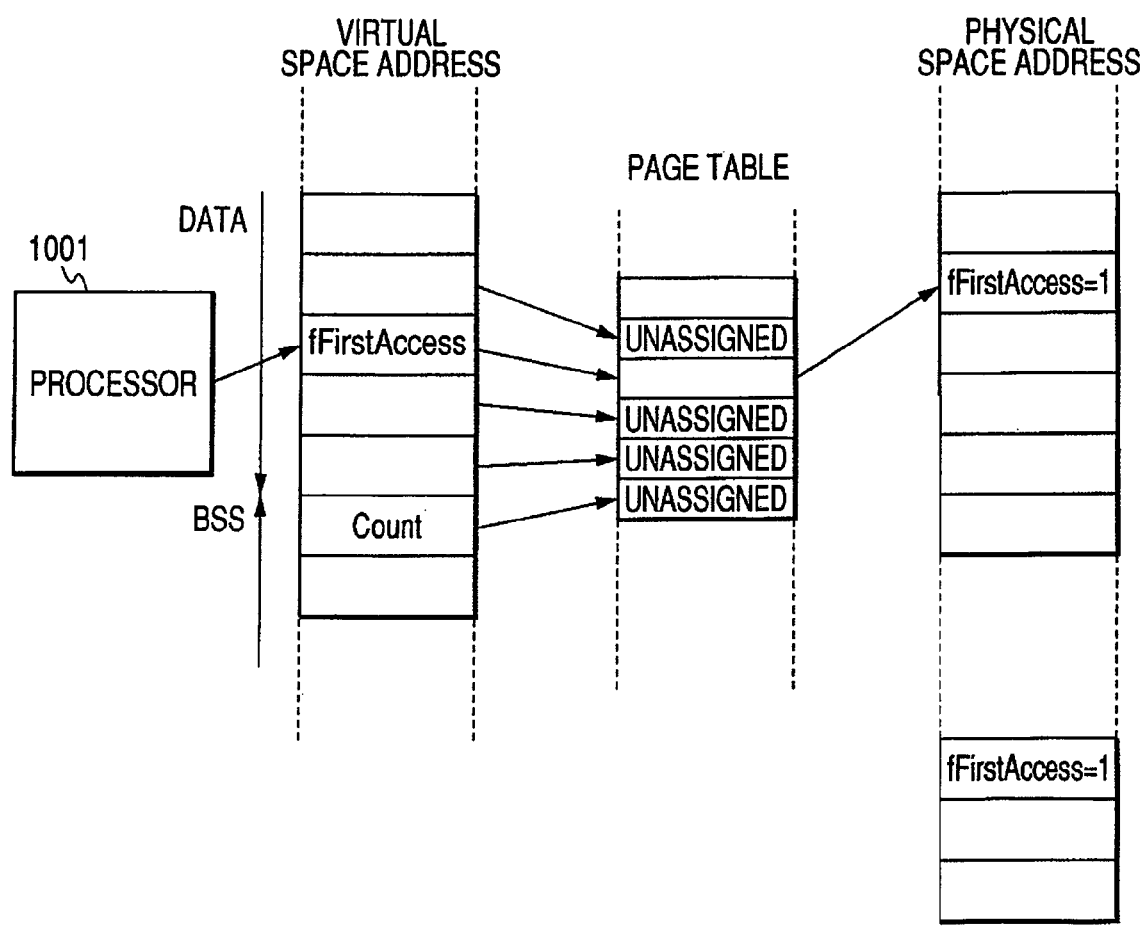
FIG. 18 is a diagram showing an example of the state that physical space addresses are set to the page table according to the second embodiment of the present invention.

FIG. 17 is a diagram showing an example of the state that a value "1" as the initial value of the variable "fFirstAccess" stored in ROM 1003 is transferred to RAM 1004 at a physical address. In addition to the initial value of the variable "fFirstAccess", all initial values in the same page of 4 KB are also transferred. At Step S1207 physical addresses are set to the page table. FIG. 18 is a diagram showing an example of the state that physical addresses are set to the page table. At Step S1208 the control is returned to the original program. As shown in FIG. 18, the variable "fFirstAccess" is assigned to the physical memory, and in the state that the initial value of "1" is substituted, the control returns to the row #105 of the program 1101 shown in FIG. 11.

Figure 19:
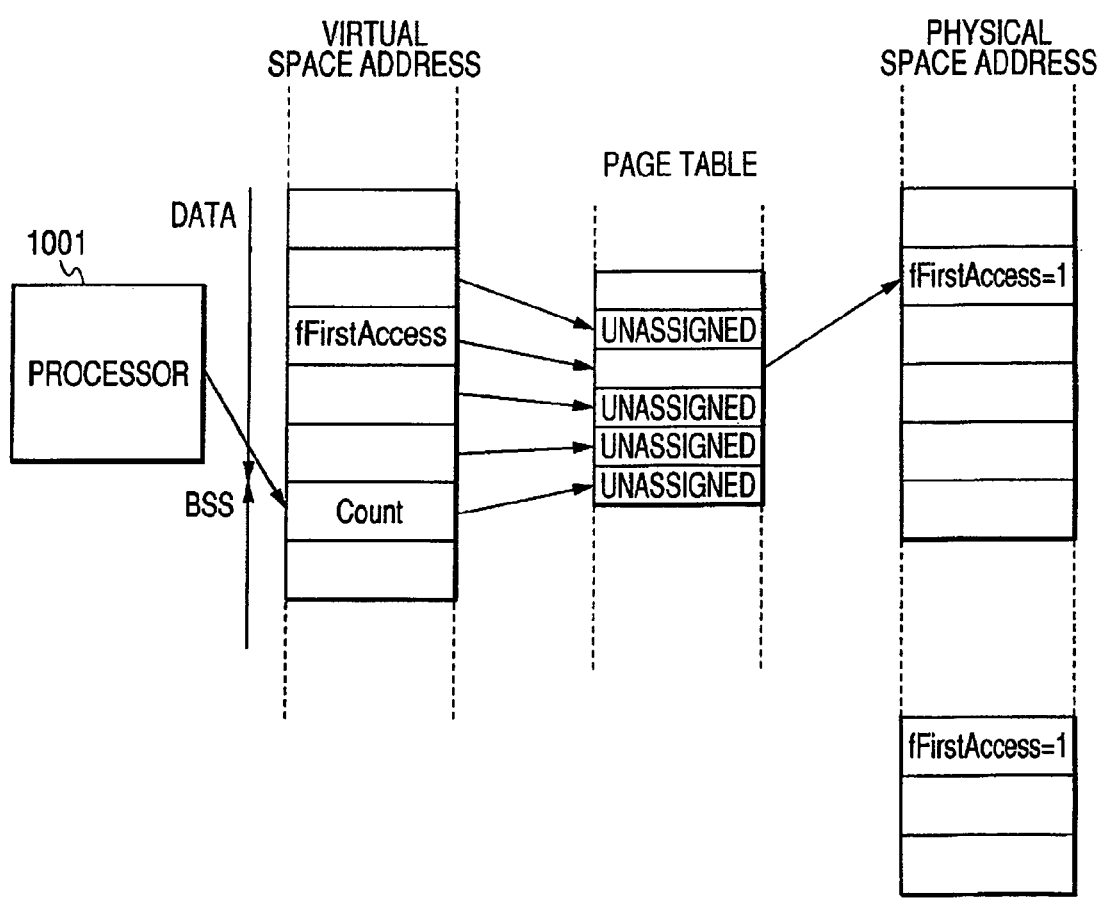
FIG. 19 is a diagram showing an example of the state when a page fault occurs according to the second embodiment of the present invention.

Since the variable "fFirstAccess" is true, the row #106 of the program 1101 shown in FIG. 11 is executed, and a value "FALSE" is substituted in the variable "fFirstAccess" at the row #107. When substitution is performed at the row #107, a page fault will not occur again because the variable "fFirstAccess" is assigned to the physical memory. As a row #109 is executed, the variable "Count" declared at the row #101 is accessed. Since the variable "Count" is in the BSS area and the page is accessed at the first time, a page fault interrupt occurs again. FIG. 19 is a diagram showing an example of the state when a page fault occurs. The subsequent operation will be described by using again the flow chart shown in FIG. 16.

Figure 16:
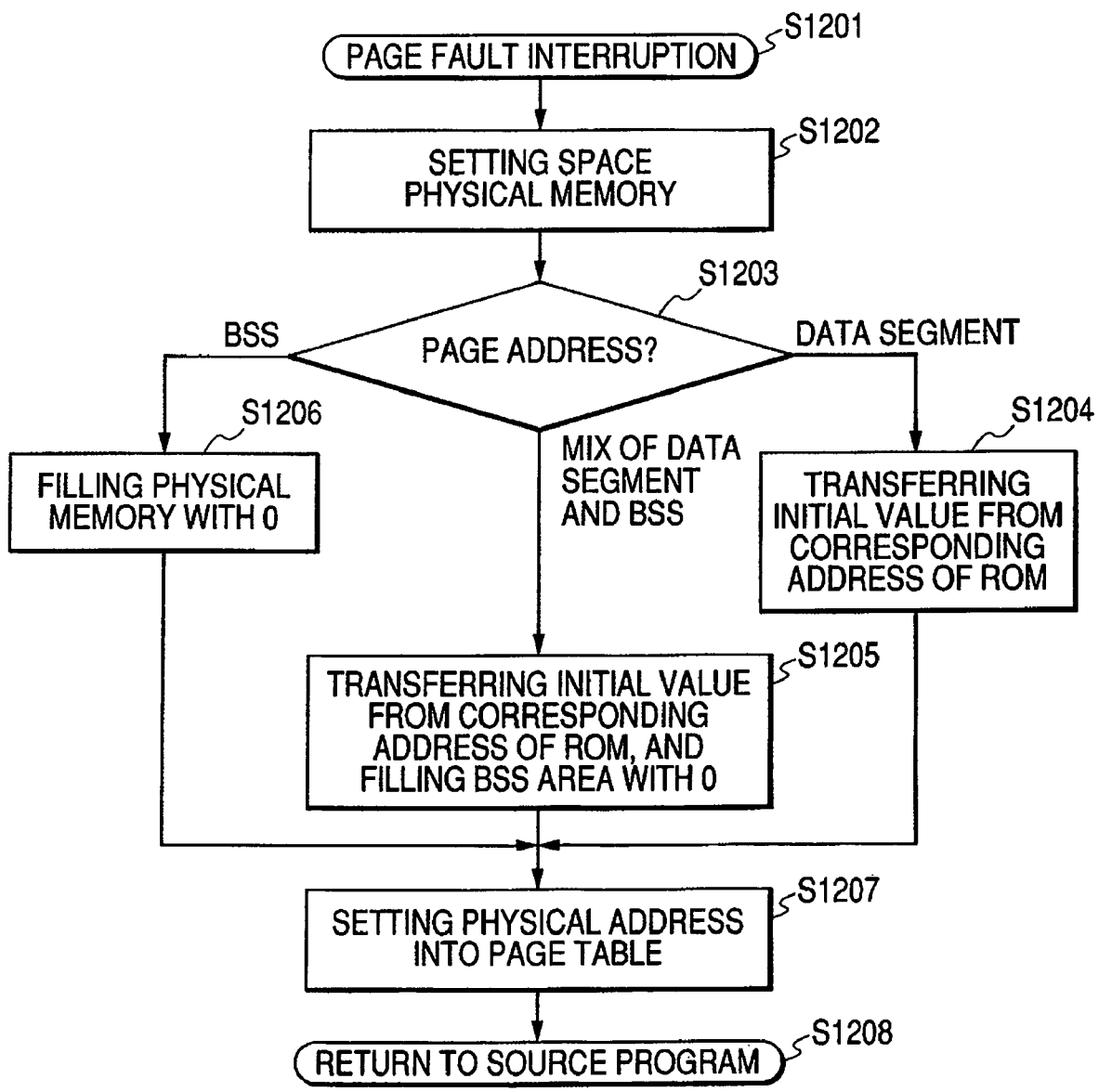
FIG. 16 is a flow chart illustrating an example of the operation to be executed by a program upon a page fault interrupt according to the second embodiment of the present invention.
Figure 20:
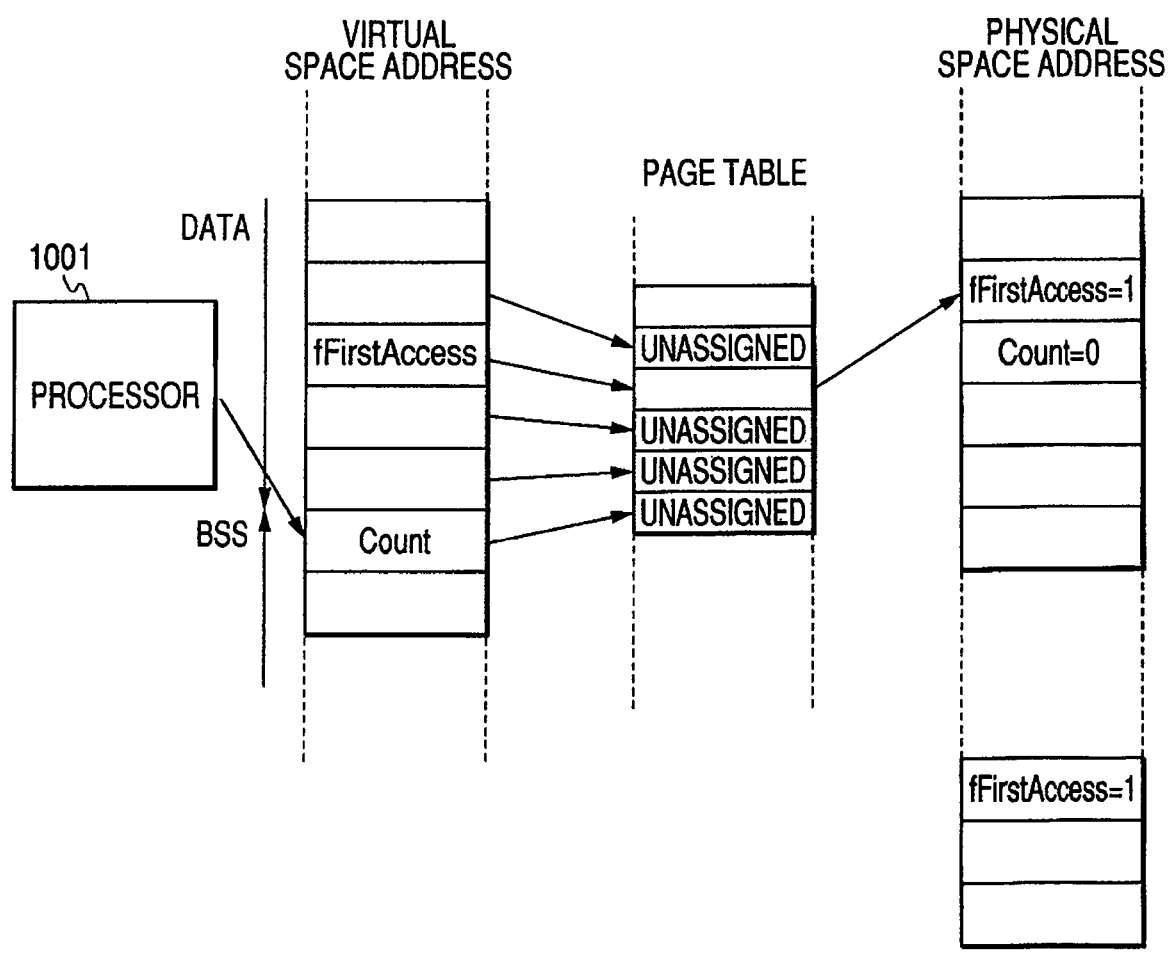
FIG. 20 is a diagram showing an example of the state immediately after 0s are buried in the physical memory according to the second embodiment of the present invention.
Figure 21:
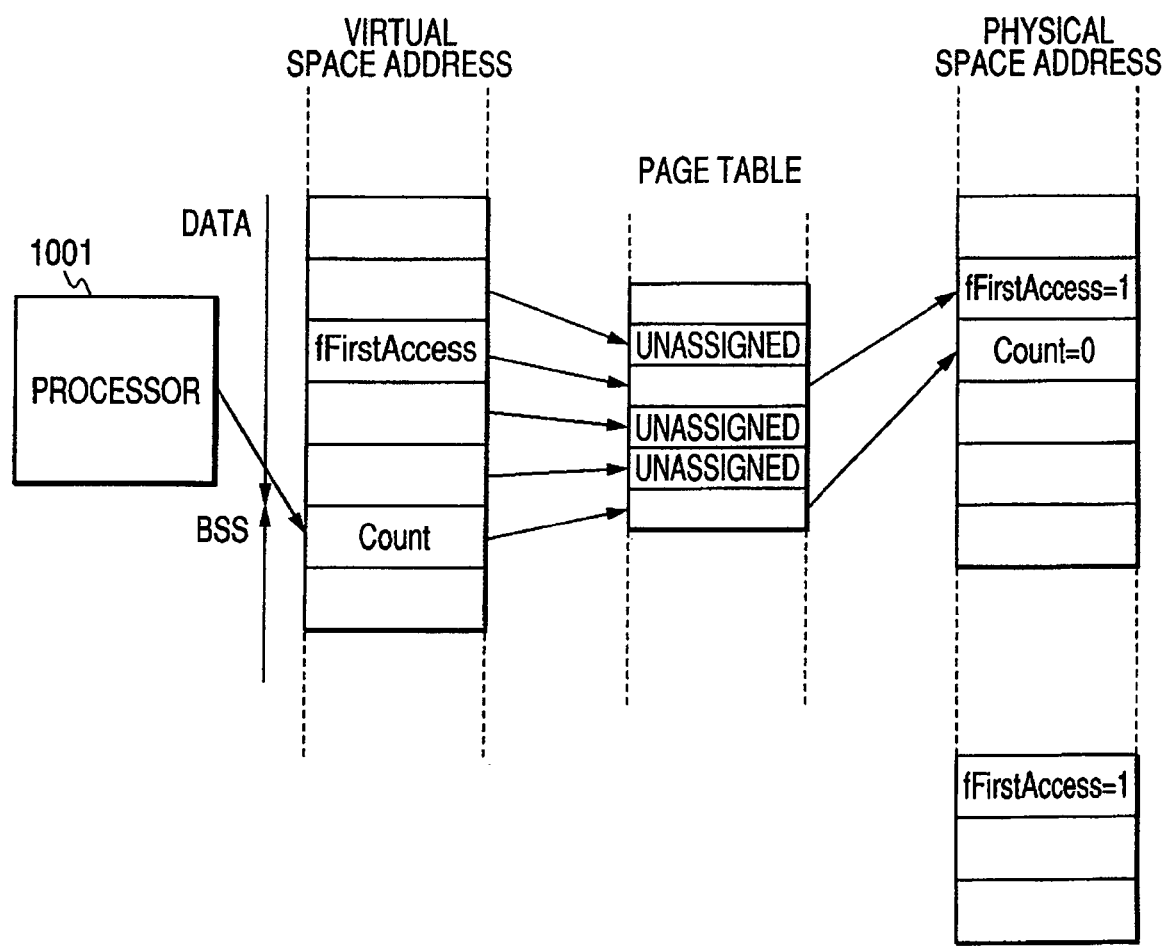
FIG. 21 is a diagram showing an example of the state immediately after the page table is updated according to the second embodiment of the present invention.

At Step S1201 shown in FIG. 16, a page fault interrupt occurs, and a blank memory is secured at Step S1202. At Step S1203 the page address is judged. Since the variable "Count" is in the BSS area, the flow branches to Step S1206 whereat the physical memory secured at Step S1202 is filled with 0s. FIG. 20 is a diagram showing an example of the state immediately after the secured physical memory is filled with 0s. At Step S1207 a physical address is set to the page table. FIG. 21 is a diagram showing an example of the state immediately after the page table is updated at Step S1207.

The processor 1301 can access the variable initialized to 0 at "Count" in the physical memory. As the control is returned to the original program at Step S1208, the row #109 of the program 1101 shown in FIG. 11 resumes. This row reads the initial value of "0" of the variable "Count", and this value is incremented and substituted. When substitution is performed, a page fault will not occur again because the physical memory is assigned.

Background Transfer

With the arrangement described above, the C language can start by omitting the wait time for data segment transfer and BSS 0-clear. A user application can be started at high speed. The operation start-up of the digital camera starts after the user application starts.

In the digital camera, there are many processes including a wait time for activation of devices, such as power supply to an image pickup device, driving the lens 1007 to an initial position, and reading file information from the memory card 1009. By utilizing this wait time, the initial value still not transferred is transferred to the data segment, and BSS still not initialized is initialized. It is therefore possible to reduce an overhead during transfer at a requested time as much as possible.

Figure 22:
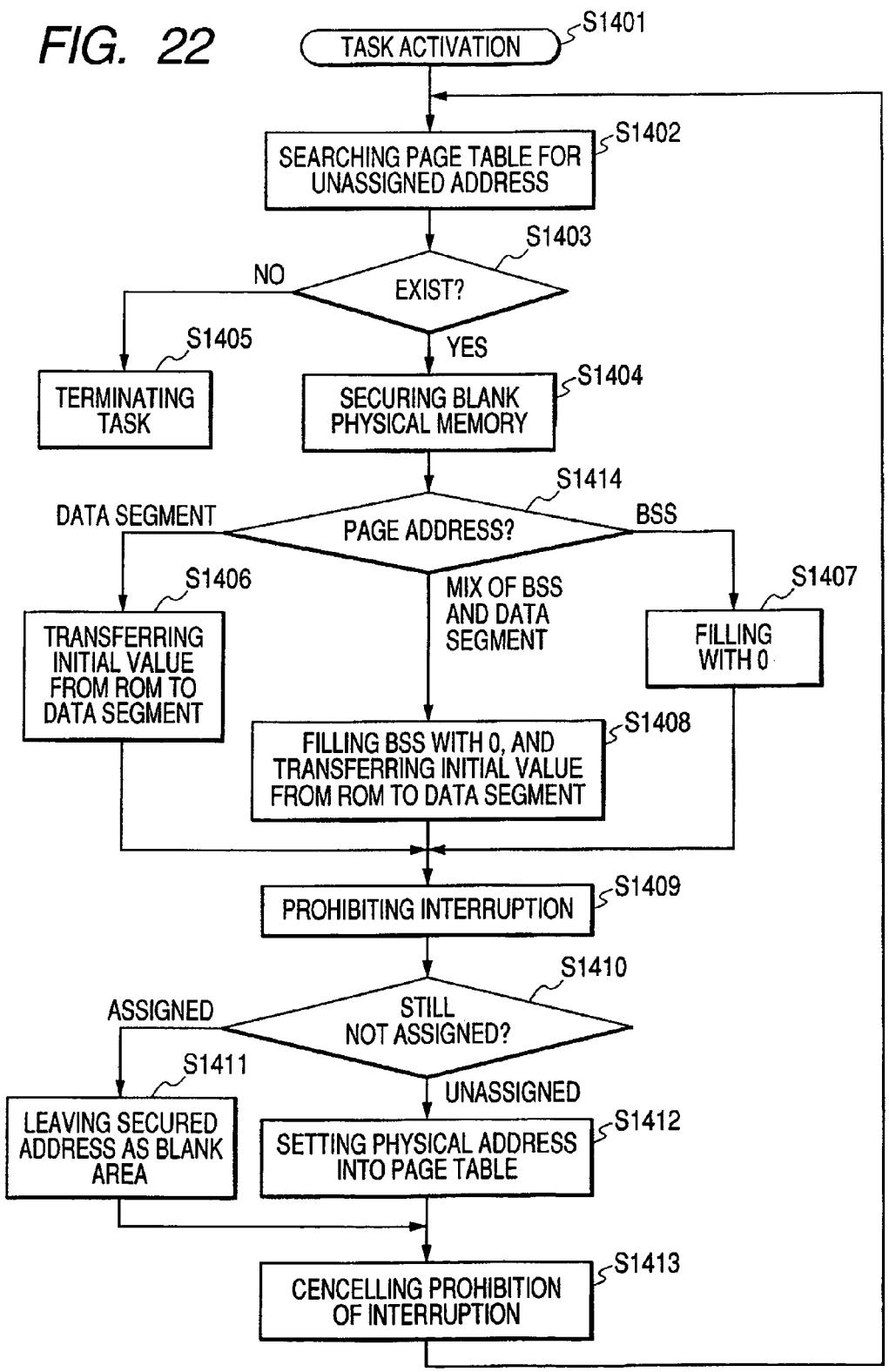
FIG. 22 is a flow chart illustrating an example of the operation to be executed by the program for initializing a background according to the second embodiment of the present invention.

With reference to the flow chart shown in FIG. 22, description will be made on an example of the operation to be executed by a program for initializing in a background. At Step S1401 a task starts. This task is activated in such a manner that a task having a lowest priority order operates. At Step S1402 the page table is searched to find an address which is not assigned with the physical address. At Step S1403, it is judged whether there is an address not assigned with a physical address.

It is considered that a case does not exist in which all addresses are already assigned at the start of execution. Therefore, after the judgement at Step S1403, the flow advances to Step S1404 whereat a blank physical memory is secured. At Step S1414 the page address is checked, and if the page address is a BSS address, the flow advances to Step S1407 whereat the secured physical memory is filled with 0s.

If the judgment of the page address at Step S1414 indicates that the page address is in the data segment, the flow branches to Step S1406 whereat the initial value of the data segment is transferred from ROM 1003 to the secured physical memory. If the judgment of the page address at Step S1414 indicates that the page address is a mixture of BSS and data segment, the flow branches to Step S1408. For BSS, the secured physical memory is filled with 0s, and for data segment an initial value is transferred from ROM 1003.

In the state that Step S1406, S1407 or S1408 is executed completely, effective initial data is stored in the secured physical memory. An interrupt is prohibited at Step S1409, and it is again confirmed at Step S1410 whether the physical address is still not assigned to the corresponding page. This is because the program is executing the task having the lowest priority order so that the page accessed by another high priority program during execution of Steps S1402 to S1409 has a possibility that the physical memory is already assigned to the this page.

If the physical address is already assigned to the corresponding page, at Step S1411 the physical address is released as a blank area, and the interrupt prohibition is released at Step S1413 to return to Step S1402. If the physical address is still not assigned to the corresponding page at Step S1410, the physical address is assigned to the page table at Step S1412. At Step S1413, the interrupt prohibition is released to return to Step S1402. It is necessary to make the interrupt into a prohibited state during the period from Step S1409 to Step S1413 to exclusively access the page table. By repetitively executing Steps S1402 to S1413, the physical address is assigned to all pages. Therefore, Step S1403 eventually branches to Step S1405 to terminate the task.

As described above, according to the embodiment, in the state that physical addresses are not assigned to both areas of data segment and BSS, the page table in the paging hardware 1002 is set and an application program is started. Thereafter, if an address not assigned with a physical address is addressed, a page fault interrupt occurs to secure a physical memory still not assigned with the physical address. If the page where the page fault occurred is in the data segment, an initial value is transferred to the secured physical memory from ROM 1003 at a corresponding address. On the other hand, if the page where the page fault occurred is in BSS, the secured physical memory is filled with 0 s. Accordingly, it is possible to omit the wait time necessary for transfer of a variable of data segment and 0-clear of BSS. It is possible to start execution of the application program without waiting for initialization of the variable area of the programming language. Therefore, for example, it is possible to shorten the time taken to allow photographing after the power source of the digital camera is turned on.

In the embodiment, although the paging hardware 1002 having virtual addresses is used, the present invention is not limited thereto. For example, a similar system can be configured by using MMU which has no translation function between virtual and physical addresses and aims only protection. In this case, a C-language starts in the state that both data segment and BSS are used as protection subject, and an initial value is transferred from ROM to a data segment area and a BSS area is initialized, upon interrupt by a protection fault. The other structures are the same as those of the second embodiment, and the description thereof is omitted.

Third Embodiment

Next, the third embodiment of the present invention will be described. In the description of the third embodiment, similar elements to those of the first and second embodiments shown in FIGS. 1 to 22 are represented by using identical reference symbols, and the detailed description thereof is omitted.

Data Segment Copy at Requested Time

Similar to the second embodiment, also in the third embodiment, by shortening the time required for initializing variables during start-up of a computer language, a framework for built-in software is provided which can operate at high speed. Although the paging hardware 1302 is used in the second embodiment, a data segment management unit to be described later is used in the third embodiment.

An initializing program, which is a first program to be cold-started after a power-on reset is released, starts operating to set the data segment management unit. In this case, for addresses covering a copied area storage register and an uncopied area access detection unit, an area of addresses is set for the data segment and BSS of a computer language to make valid the uncopied area access detection unit. A process of copying an initial value of data segment essentially existing in ROM 1003, to RAM 1004 and a process of filling a BSS area with 0s are not executed, but the control is passed directly to an application program written by a high level language.

If the processor (CPU) 1001 accesses the data segment during execution of the application program, the program is stopped by the uncopied area access detection unit. An initial value of a portion in the data segment accessed by the processor 1001 is copied from ROM 1003 by an initial data copy unit, and management information of a copied area management table is updated to return the control to the program. As the process 1001 again accesses the same area, the program is not intercepted by the uncopied area access detection unit because the copied area management table records the fact that the copy is already made. This embodiment is realized by using such programs. The details of the embodiment will be described with reference to the accompanying drawings.

Digital Camera

Figure 23:
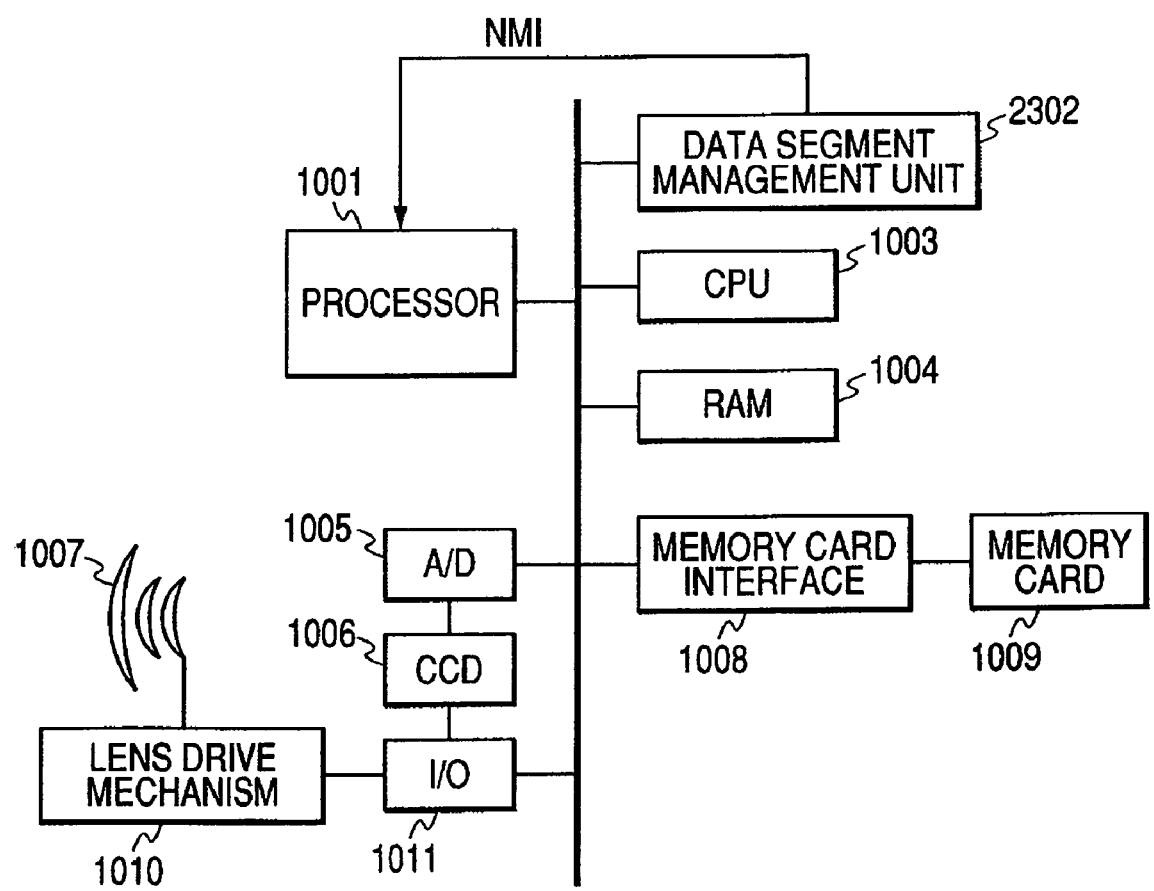
FIG. 23 is a diagram showing an example of the hardware structure of a digital camera according to a third embodiment of the present invention.

FIG. 23 is a diagram showing an example of the hardware structure of a digital camera according to the third embodiment of the present invention.

In FIG. 23, a data segment management unit 2302 is a hardware processing unit. The data segment management unit 2302 manages both the data segment and BSS by dividing them into pages having a fixed length, and is designed as a removal computer peripheral device of a bus-connected type. Other devices are the same as those shown in FIG. 2. Similar to the first and second embodiments, as a power source is turned on, the processor 1001 reads and starts executing an instruction at an address called a reset vector of the program stored in ROM 1003. The data segment management unit 2302 is in the initial state immediately after reset and in an uncopied area access detection function halt state. The process of photographing an image and recording it in the memory card 1009 does not concern about the essential contents of the embodiment, so that the description thereof is omitted.

Data Segment Management Unit

Figure 24:
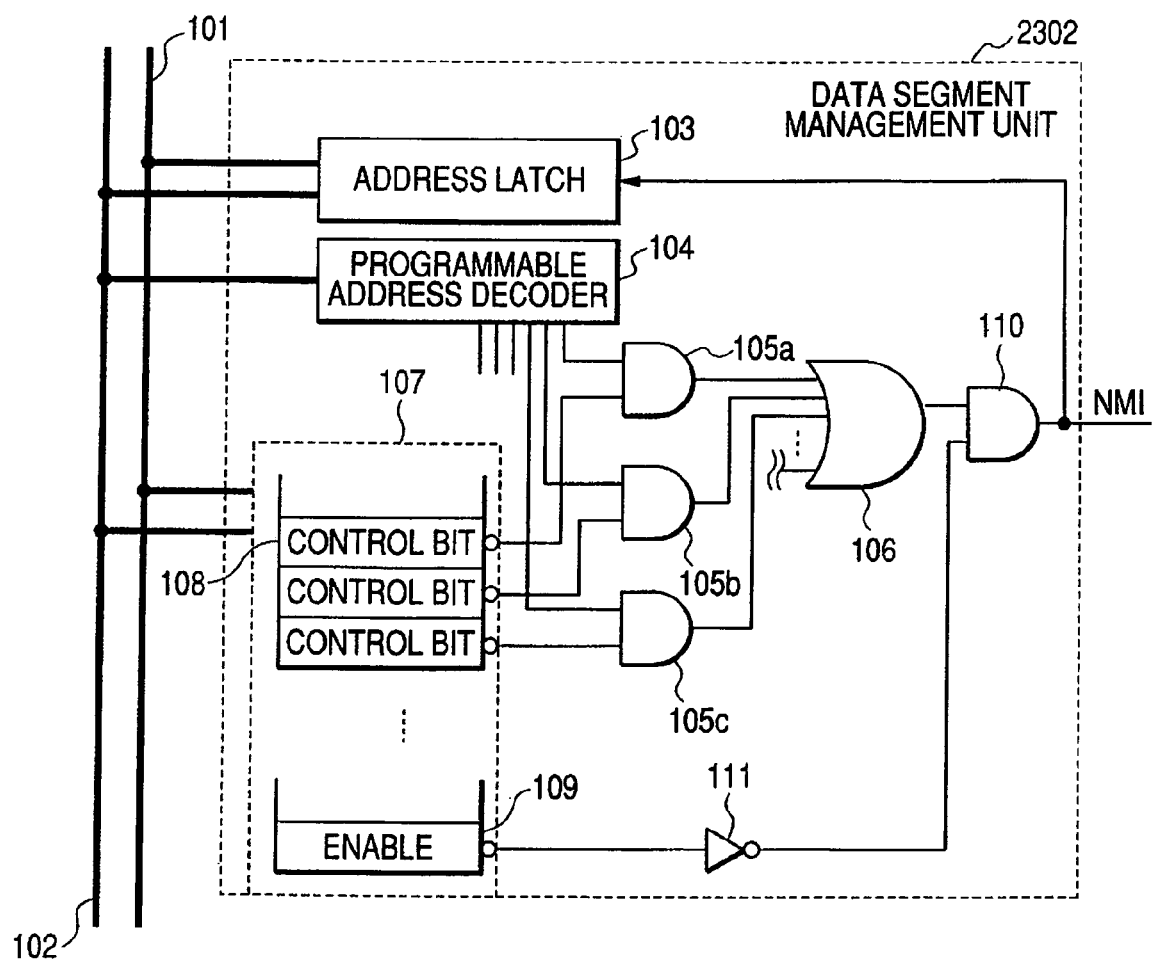
FIG. 24 is a block diagram showing the details of the structure of a data segment management unit according to the third embodiment of the present invention.

FIG. 24 is a block diagram showing the details of the structure of the data segment management unit 2302 according to the third embodiment of the present invention. In FIG. 24, reference numeral 101 denotes a data bus and reference numeral 102 denotes an address bus. The data bus 101 and address bus 102 are connected to the data segment management unit 2302.

An address latch 103 latches an address of an uninitialized area when this area is detected. A programmable address decoder 104 can set the addresses where the data segment and BSS start. An AND circuit group 105 has a plurality of AND circuits for detecting that an address is accessed, which address corresponds to a stored area storage bit 108 of a copied area management table 107. An OR circuit 106 outputs a signal when any one of AND circuits in the AND circuit group 105 outputs a signal. A copied area management table 107 stores a bit group indicating whether an area is an uncopied area. The copied area management table 107 of the embodiment is, for example, a register whose read/write is performed by the processor 1001.

The stored area storage bit 108 corresponds to one area of the copied area management table 107. A data segment management unit enable bit 109 is a special bit which is used for permitting or prohibiting the function of the data segment management unit 2302. An AND circuit 110 outputs a signal when not only a signal is output from the OR circuit 106 but also a data segment management unit enable bit 109 for permitting the function of the data segment management unit 2302 is output. A NOT circuit 111 inverts the data segment management unit enable bit 109.

Page Unit

Figure 25:
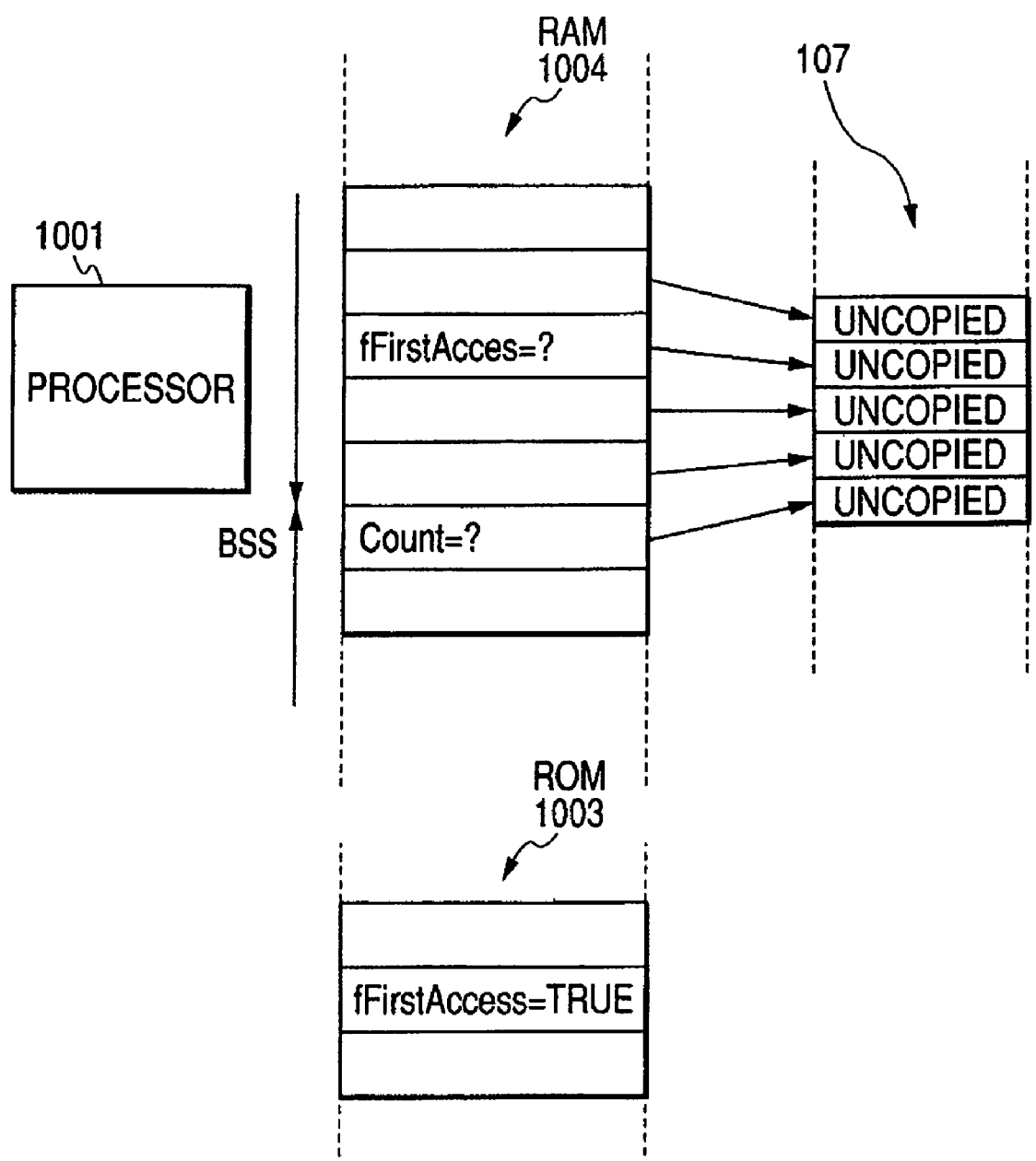
FIG. 25 is a diagram conceptually showing an example of a copied area storage register according to the third embodiment of the present invention.

FIG. 25 is a diagram conceptually showing an example of the structure of a copied area management table 107. In FIG. 25, each bit of the copied area management table 107 corresponds to each area of RAM 1004. RAM 1004 is divided into pages having a 4 KB. Each copied area storage bit 108 corresponds to each divided page. At latch of 200 bits is therefore sufficient to manage areas of, e.g., 800 KB.

Copied Area Management Table

Figure 26:
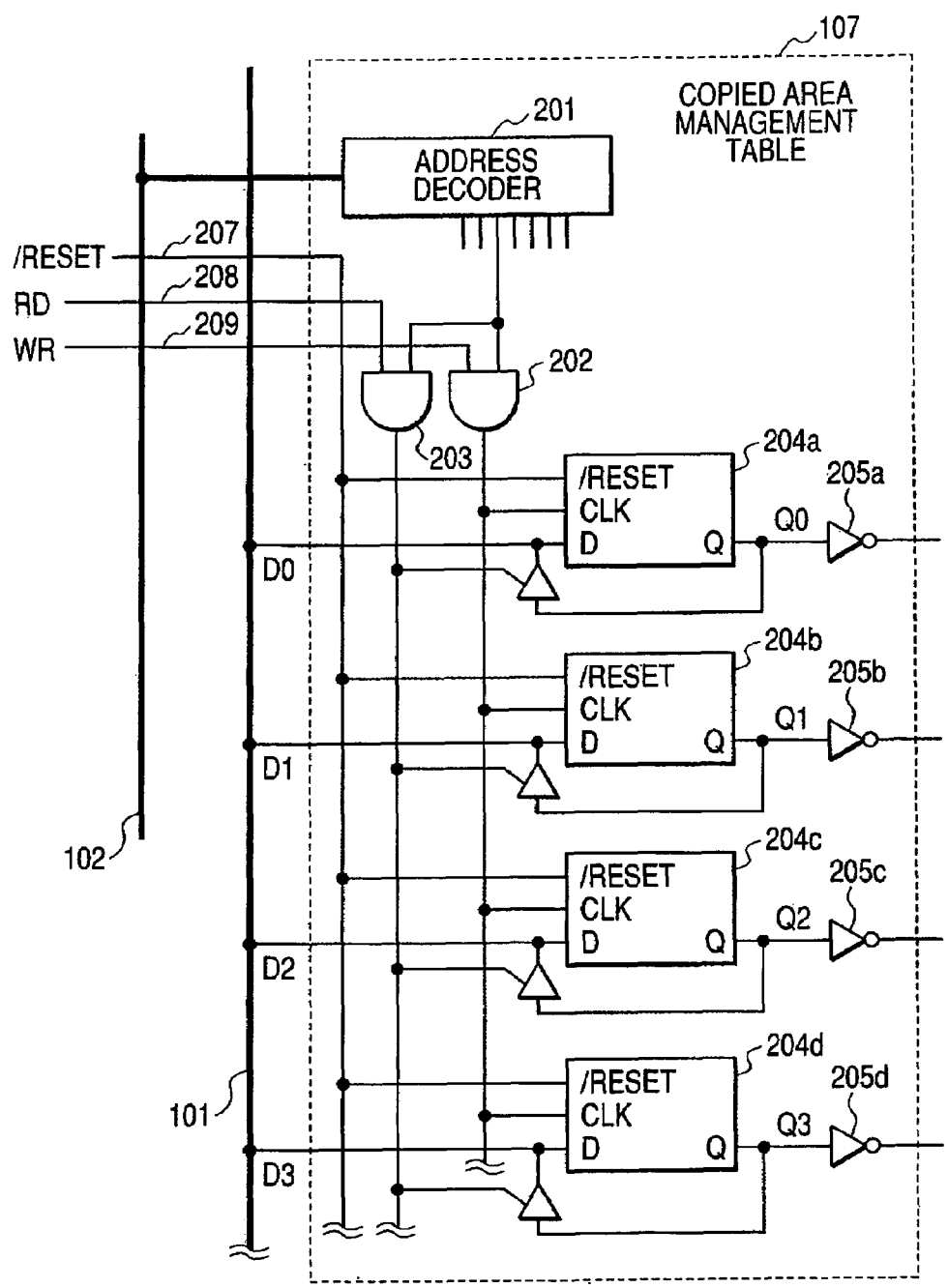
FIG. 26 is a diagram showing the details of the copied area storage register according to the third embodiment of the present invention.

FIG. 26 is a diagram showing the details of an example of the structure of the copied area management table 107. In FIG. 26, an address decoder 201 decodes a bit read/write address supplied from the processor (CPU) 1001. A latch 204 corresponds to each copied area storage bit 108 shown in FIG. 24. Reference numeral 207 denotes a reset signal (/RESET), reference numeral 208 denotes a read strobe signal (RD) and reference numeral 209 denotes a write strobe signal (WR). An AND circuit 202 outputs a write signal when both the write strobe signal 209 and address decoder 201 become true, to make the latch 204 corresponding to a particular address fetch data D0 to D3 from the data bus 101. An AND circuit 203 outputs a read signal when both the read strobe signal 208 and address decoder 201 become true, to output data Q0 to Q3 of the latch 204 corresponding to a particular address to the data bus 101. A NOT circuit 205 inverts an output of the latch 204.

If the processor 1001 is a 32-bit CPU, the data bus 101 is 32 bits so that 32 bits can be read/written at a time. In this case, connected to one output of the address decoder 201 are the AND circuits 202 and 203 and thirty two latches 204. An inverted output of each latch 204 is input to the AND circuit 105 shown in FIG. 24. A value of the latch 204 at reset is 0 and the inverted output is high.

An example of the program and an example of an assembler list obtained by compiling the program are the same as those shown in FIGS. 11 and 12.

Embodiment Start-Up

Figure 27:
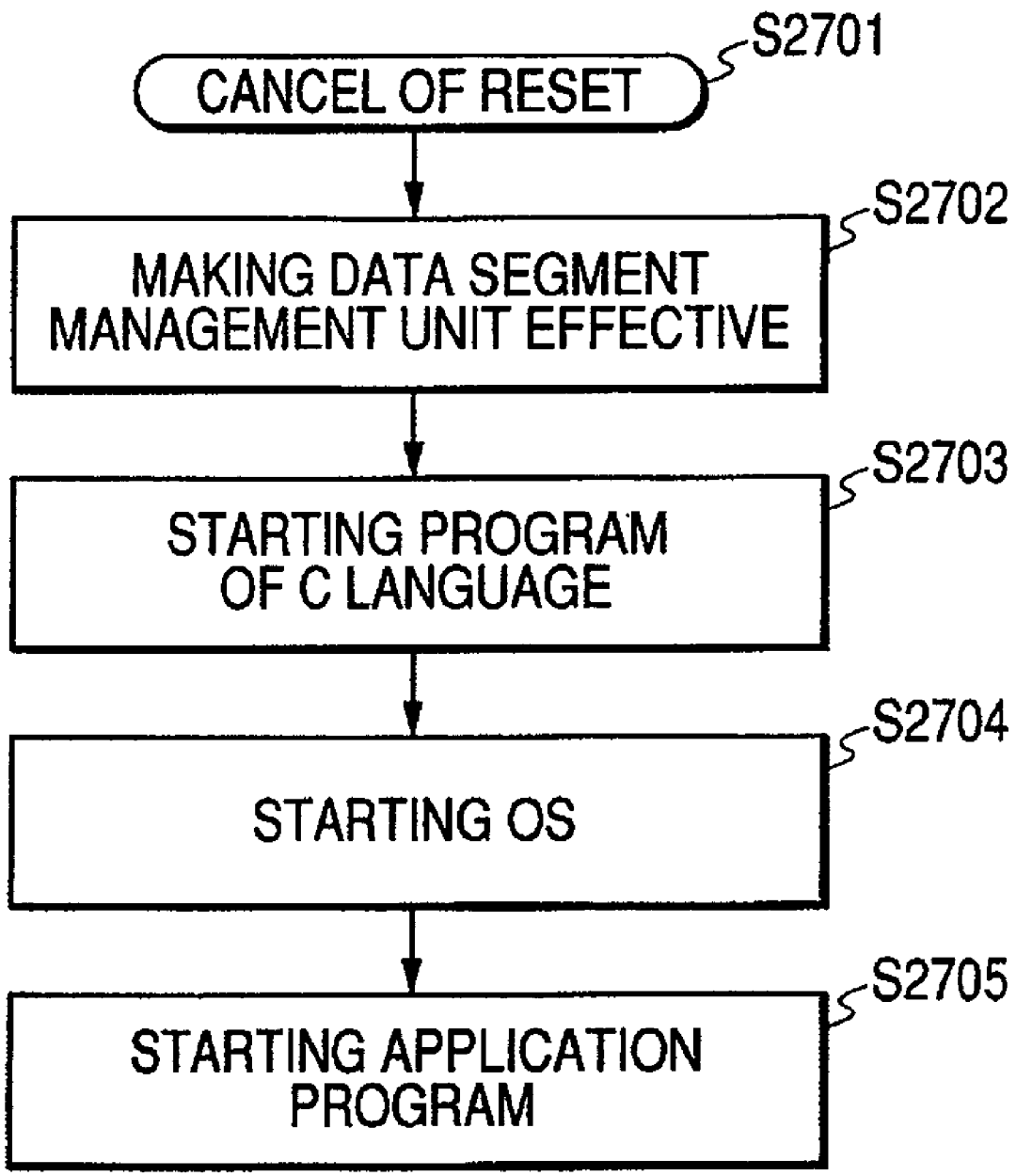
FIG. 27 is a flow chart illustrating an example of the start-up operation according to the third embodiment of the present invention.

With reference to the flow chart shown in FIG. 27, description will be made on an example of the start-up operation of the embodiment. At the reset is released at Step S2701, the data segment management unit 2302 shown in FIG. 23 is set at Step S2702. In this case, a management start address is set in such a manner that the data segment management unit 2302 is made effective for the areas of both the data segment and BSS to enable the uncopied area access detection function. A C language starts at Step S2703, an OS starts at Step S2704, and an application program starts at Step S2705.

Access to Data Segment

Figure 28:
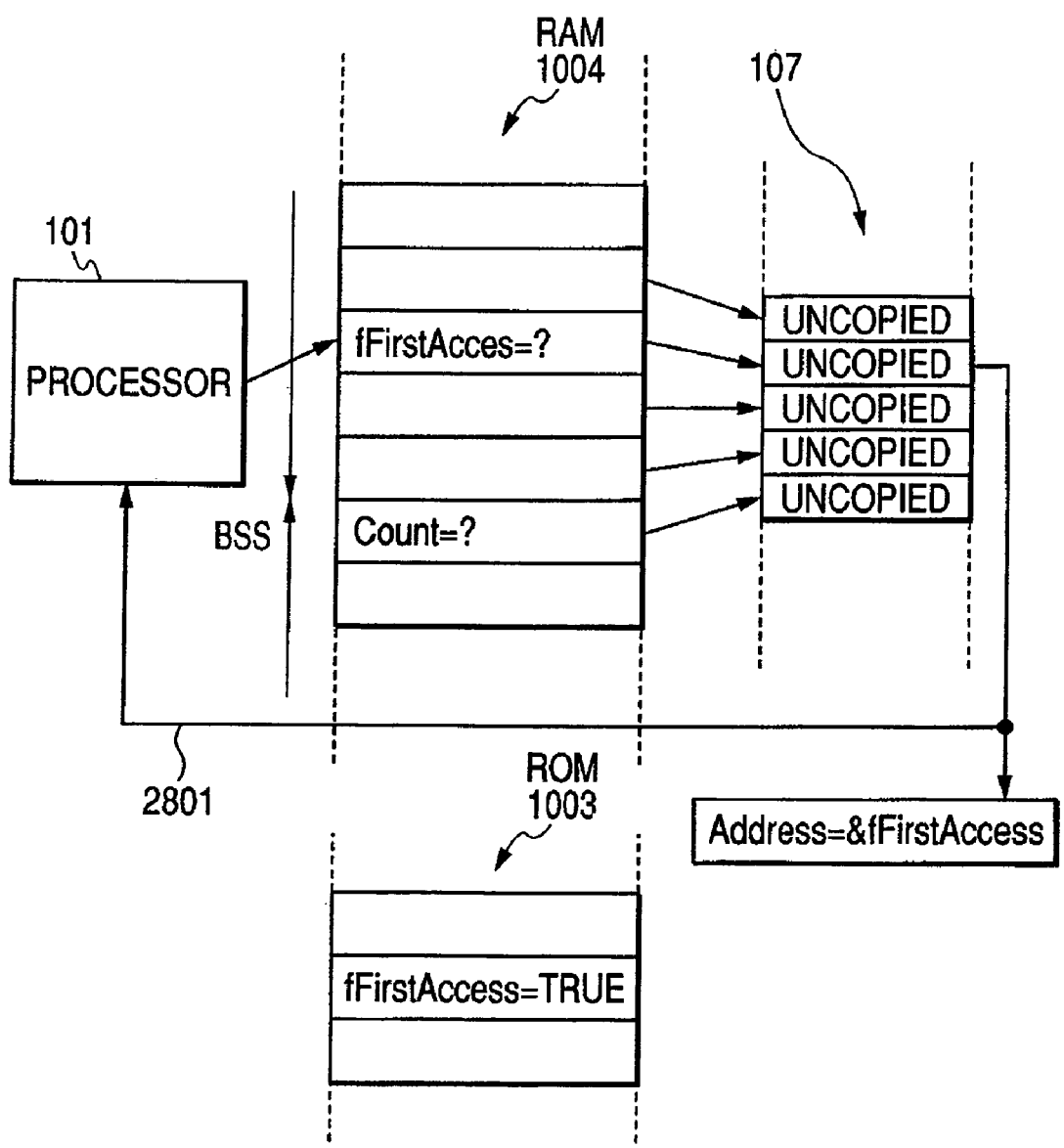
FIG. 28 is a diagram showing an example of the state that a variable "fFirstAccess" is addressed by a processor according to the third embodiment of the present invention.

Description will be made on how the application program is executed at Step S2705 in the flow chart shown in FIG. 27, by using the program 1101 shown in FIG. 11 as an example. The application program is executed from a row #103 of the program 1101 shown in FIG. 11. An effective row to be executed first is the row #105. The row #105 is a branch routine in which the row #106 is executed if the variable "fFirstAccess" is true, whereas the row #108 is executed if it is false. By executing the row #105, the value of the variable "fFirstAccess" declared at the row #100 is read. FIG. 28 is a diagram showing an example of the state that the processor 1001 addresses the variable "fFirstAccess". Since a bit in the copied area management table 107 corresponding to the variable "fFirstAccess" is in a uncopied state, an output of the AND circuit 110 shown in FIG. 24 becomes active so that the address of the variable "fFirstAccess" is recorded in the address latch 103. A non-maskable interrupt (NMI) signal 2801 is output to the processor 1001 so that an NMI interrupt handler is activated.

Process by NMI Interrupt Handler (Initial Data Copy Function)

Figure 29:
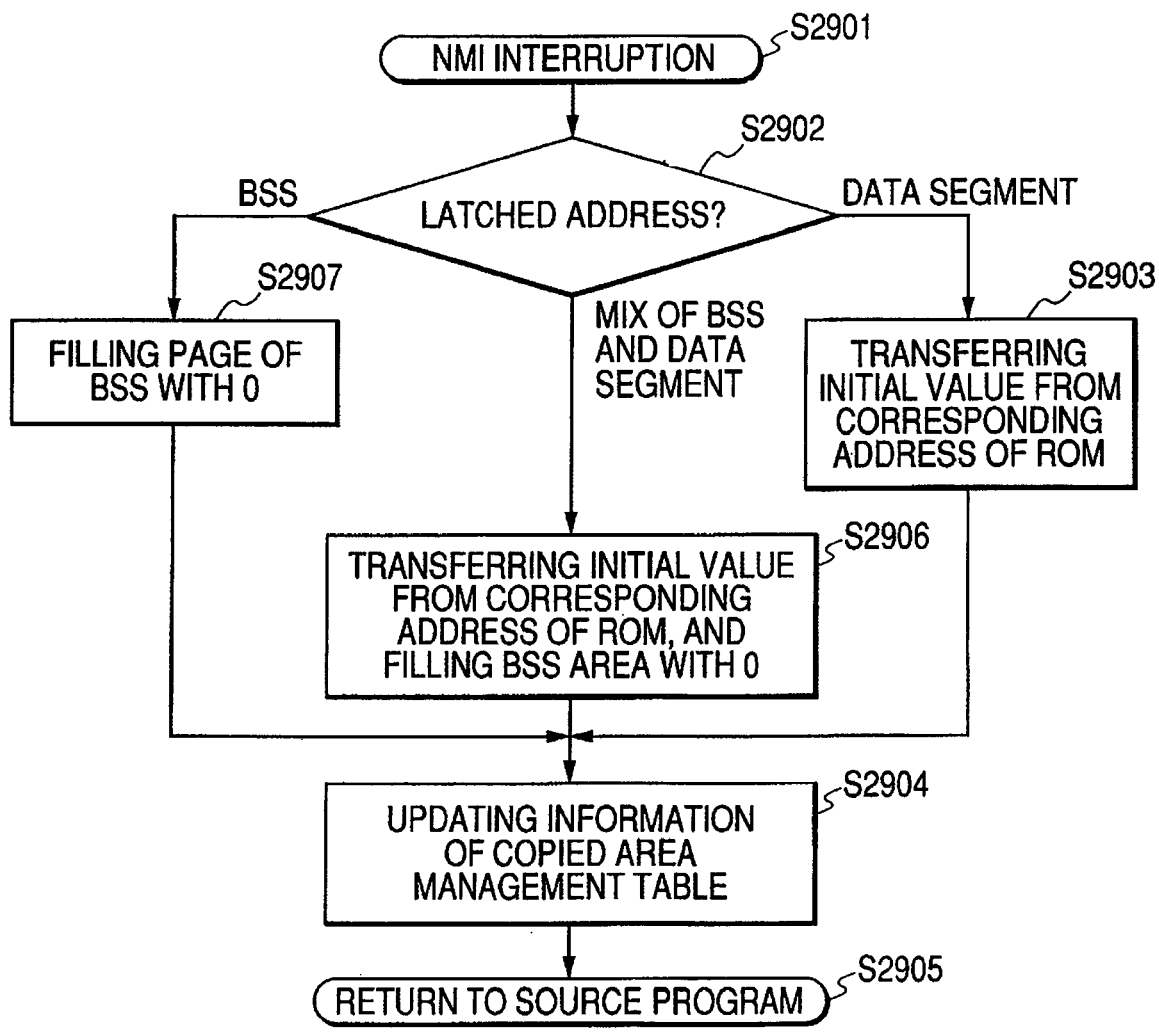
FIG. 29 is a flow chart illustrating an example of the operation to be executed by an NMI interrupt handler according to the third embodiment of the present invention.
Figure 30:
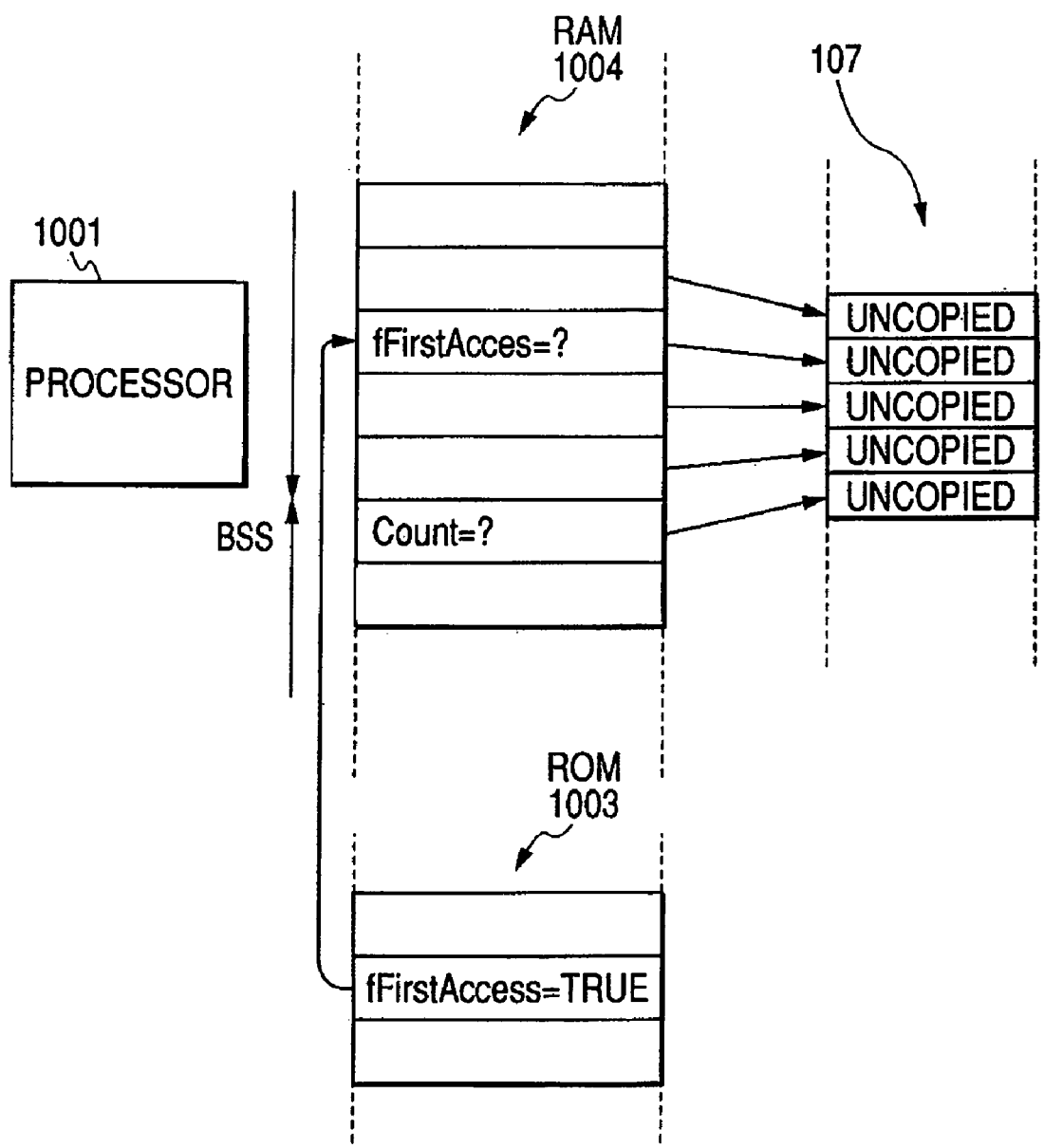
FIG. 30 is a diagram showing an example of the state that an initial value "TRUE" of a variable "fFirstAccess" is transferred from ROM to RAM according to the third embodiment of the present invention.

FIG. 29 is a flow chart illustrating an example of the process to be executed by an NMI interrupt handler. As an NMI interrupt process starts at Step S2901, an address latched by the address latch 103 shown in FIG. 24 is checked at Step S2902. Since the above-described variable "fFirstAccess" is a variable in the data segment, the flow branches to Step S2903 whereat the initial value of the page of 4 KB containing the variable "fFirstAccess" is transferred from ROM 1003 at the corresponding address. FIG. 30 is a diagram showing an example of the state that the initial value "TRUE" of the variable "fFirstAccess" is transferred from ROM 1003 to RAM 1004.

Figure 31:
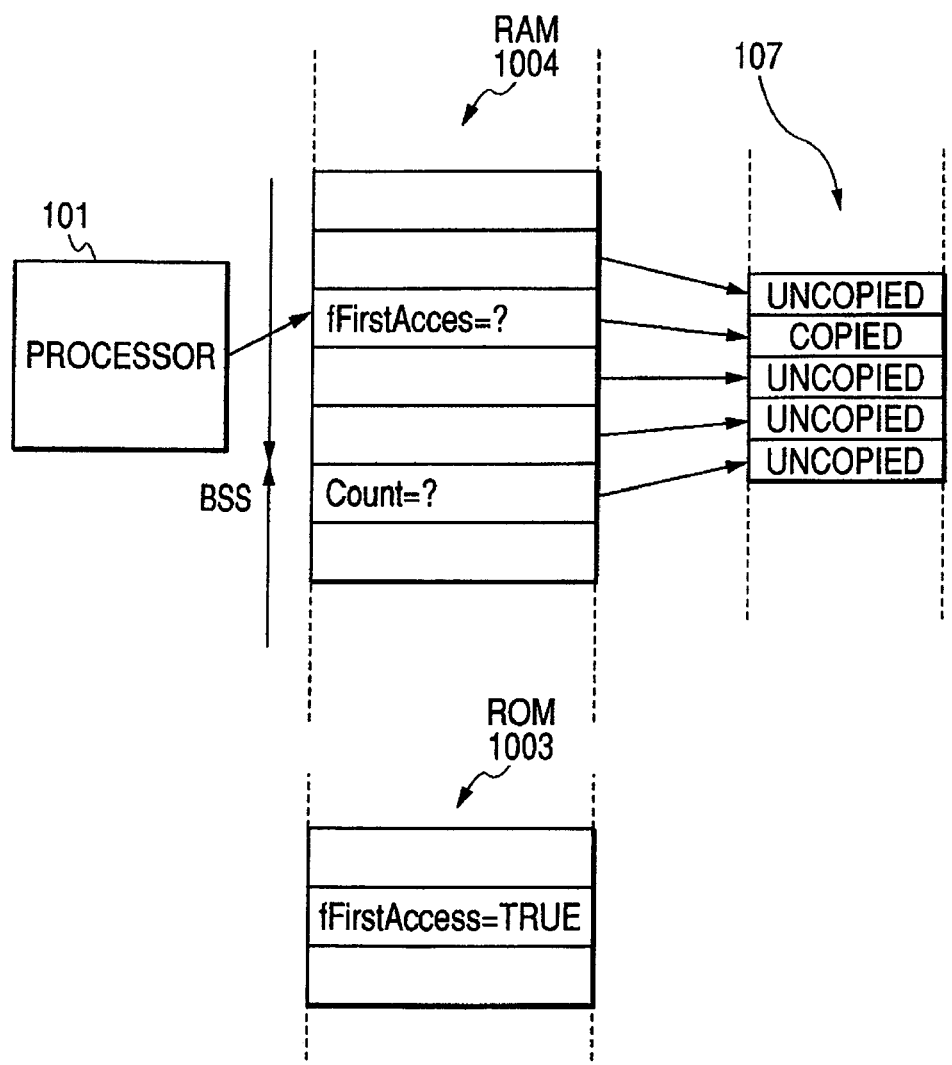
FIG. 31 is a diagram showing an example of the state that information on the copied area storage register is updated according to the third embodiment of the present invention.

At Step S2904, information on the copied area management table 107 is updated at Step S2904. FIG. 31 is a diagram showing an example of the state that the information on the copied area management table 107 is updated. At Step S2905, the control is returned to the original program after the program counter is set in such a manner that the operation starts from the instruction which caused the NMI interrupt.

If it is judged at Step S2902 that the address latched by the address latch 103 is in the page of 4 kB containing the variable "fFirstAccess" corresponding to the page containing both the data segment and BSS, then the flow advances to Step S2906. The initial value of the data segment is transferred from ROM 1003 to RAM 1004 and data in the BSS area is initialized to 0s. As the program 1101 shown in FIG. 11 advances up to the row #107, the variable "fFirstAccess" is accessed again. However, in this case, the NMI interrupt handler will not be activated again because the information on the copied area storage register shown in FIG. 24 is already copied.

Access of BSS

As the program 1101 shown in FIG. 11 advances up to the row #109 and the variable "Count" is accessed, the NMI interrupt handler is again activated to execute the NMI interrupt handler process shown in FIG. 29. In this case, the address latched by the address latch 103 is in the BSS area. Therefore, the flow advances from Step S2902 to Step S2907 whereat all bits of 4 KB of the page containing the variable "Count" are initialized to 0s. The flow advances to Step S2904 whereat the information on the copied area management table 107 is updated, and the control is returned to the original program at Step S2905.

Background Transfer

With the arrangement constructed as above, the program 1101 of the C language can starts by omitting the wait time necessary for data segment transfer and BSS 0-clear. The user application can start at high speed. The start-up of the digital camera starts as the user application starts.

In the digital camera, there are many processes including a wait time for activation of devices, such as power supply to an image pickup device, driving the lens 1007 to an initial position, and reading file information from the memory card 1009. By utilizing this wait time, the initial value still not transferred is transferred to the data segment, and BSS still not initialized is initialized. It is therefore possible to reduce an overhead of transfer at a requested time as much as possible.

Figure 32:
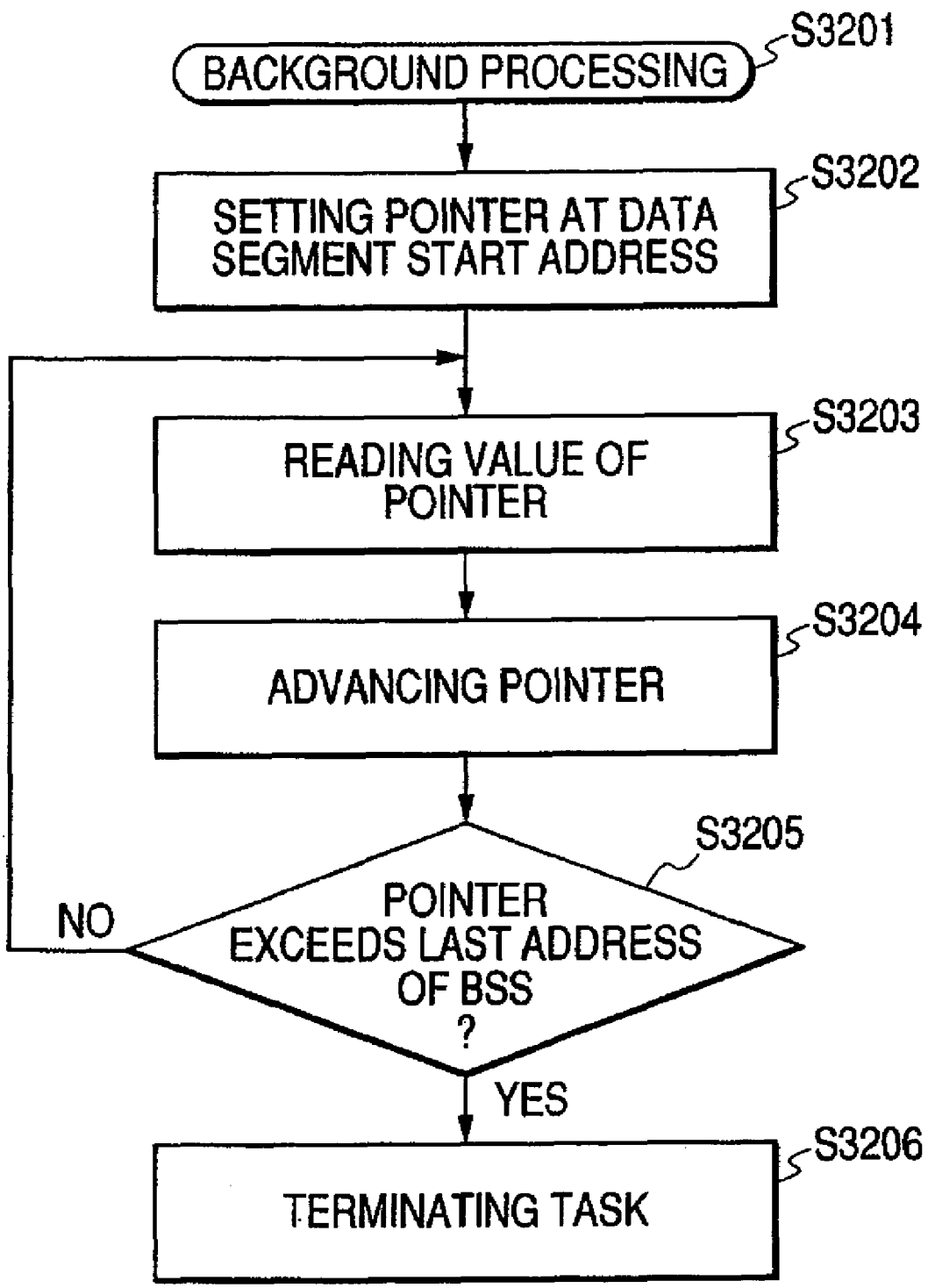
FIG. 32 is a flow chart illustrating an example of a background process according to the third embodiment of the present invention.

FIG. 32 is a flow chart illustrating an example of the background process of the embodiment. A program for activating the background process is executed as a task having a lowest priority order. Since this program operates only while another program to be executed does not exist, the operation of the digital camera will not be affected.

As the task starts at Step S3201, a start address of the data segment is set to the pointer at Step S3202. Next, the value of the pointer is read at Step S3203. Therefore, the same event occurs as the program 1101 shown in FIG. 11 accesses the variable "fFirstAccess" at the row #105. If the copied area storage bit 108 of the copied area management table 107 is still not copied, the NMI interrupt handler process shown in FIG. 31 is activated and the initial value is transferred from ROM 1003 to RAM 1004.

Next, at Step S3204 the pointer is advanced by a page size of 4 KB. Next, at Step S3205 it is judged whether the pointer exceeds the last address of BSS. If exceeds, the flow returns to Step S3203 to repeat Steps S3202 to S3205. After the whole area of the data segment and BSS is initialized completely, the flow advances from Step S3205 to Step S3206 whereat the background task is terminated.

As described above, according to the embodiment, data copy is executed from the area of ROM 1003 where the initial value of the data segment is stored to the corresponding area (RAM 1004) of the data segment. The copied area management table 107 is provided for storing information on whether the data copy is executed. When an access is detected to an area in the data segment of RAM 1004 where the data copy from ROM 1003 is still not executed, the program under execution is intercepted. After data copy is executed from ROM 1003 to RAM 1004 during the NMI interrupt handler process, information on the copied area management table 107 is updated to resume execution of the program. In this manner, the operation of copying the initial value of the data segment from ROM 1003 to RAM 1004 can be executed distributively on-demand (at a requested time).

Although initialization of all data segments has been required conventionally before execution of a program, only a necessary portion can be executed distributively while the program progresses. It is therefore possible to considerably shorten a time lag between the start-up and program execution.

The copied area management table 107 of this embodiment is a register which the processor (CPU) 1001 can read and write. Each copied area storage bit 108 corresponds to a block having a fixed size starting from a particular address of RAM 1004. An output of the copied area management table 107 and the address bus 102 are monitored. When it is detected that the address is identical with an uncopied area of management information of the copied area management table 107, the detected address is automatically loaded in the register which the processor (CPU) 1001 can read and write. Upon occurrence of exception of NMI, the program under execution is intercepted and data copy is performed from ROM 1003 to RAM 1004. Thereafter, the information on the copied area management table 107 is updated to thereafter resume execution of the program. This is realized by a software exclusive process handler so that the system can be configured at a small circuit scale.

The start address, covering the copied area management table 107 and the uncopied area access detection unit for detecting an access to an uncopied area, can be dynamically set. Therefore, the area covering the copied area management table and uncopied area access detection unit can be set to an optimum size.

The uncopied area access detection unit has an uncopied area access detection prohibition function of stopping the detection function. Therefore, the uncopied area access detection prohibition state can be automatically realized on power-on reset (on cold start). The copied area storage register is automatically set in such a manner that all areas are set to uncopied areas on power-on reset (on cold start). In this manner, it becomes possible to shorten the time required for initialization by software, and to start up the computer in a shorter time.

During the start-up of a digital camera, there are many shorter wait times of the processor (CPU) 1001, such as driving the lens 1007 and reading a file. In this embodiment, therefore, executed during the idle time while an effective program to be executed does not exist, are data copy from ROM 1003 to RAM 1004 and update of the information on the copied area management table 107. In this manner, since there is a high possibility that data copy from ROM 1003 to RAM 1004 is already completed when a program accesses a data segment, the processes can be executed at higher speed.

Other Embodiments of the Invention

The scope of the invention contains also the case wherein software program codes realizing the function of each embodiment described above are supplied to a computer (CPU or MPU) of an apparatus or system connected to various devices so as to operate the devices and realize the embodiment functions, and the devices are operated in accordance with the program codes stored in the computer of the system or apparatus.

In this case, the software program codes themselves realize the embodiment function. Therefore, the program codes themselves and means for supplying the program codes to the computer, e.g., a storage medium storing the program codes, constitute the present invention. The storage medium for storing such program codes may be a flexible disk, a hard disk, an optical disk, a magneto optical disk, a CD-ROM, a magnetic tape, a nonvolatile memory card, a ROM or the like.

It is obvious that the program codes are included in the embodiment of the invention, wherein not only the computer executes the supplied program codes to realize the embodiment functions but also the program codes in cooperation with an OS (operating system) running on the computer or with another application or the like realize the embodiment functions.

It is obvious that the scope of the invention also contains the case wherein the functions of each embodiment can be realized by writing the program codes into a memory of a function expansion board inserted into a computer or of a function expansion unit connected to the computer, and thereafter by making a CPU of the function expansion board or function expansion unit execute a portion or the whole of actual processes.

The present invention has been described above in connection with preferred embodiments. The present invention is not limited only to the above-described embodiments, but various modifications are possible without departing from the scope of claims.

This application claims priority from Japanese Patent Application Nos. 2004-374386 filed on Dec. 24, 2004, 2004-374765 filed on Dec. 24, 2004 and 2005-126957 filed on Apr. 25, 2005, which are hereby incorporated by reference herein.

What is claimed is:

1. An electronic apparatus for executing a program by using a page table for managing, on a page unit basis, virtual and physical addresses of the program, comprising:
    an initializing unit, which sets said page table in such a manner that a physical address is unassigned to an area of a variable of the program and initializes said page table;
    a program executing unit, which executes the program after said page table is initialized by said initializing unit; and
    a variable setting unit, which sets, when an area unassigned with said physical address is accessed during execution of the program by said program executing unit, an initial value of the variable in the area,
    wherein said initializing unit sets said page table in such a manner that physical addresses of a data segment area and a BSS area are unassigned and initializes said page table, and
    wherein if the area unassigned with said physical address is the BSS area, said variable setting unit sets 0 as the initial value of the variable in the area, whereas if the area unassigned with said physical address is the data segment area, said variable setting unit reads the initial value of the variable from a predetermined recording medium and sets the read initial value as the initial value of the variable.

2. The electronic apparatus according to claim 1, further comprising:
    an interrupt process executing unit, which executes a page fault interrupt process when a page fault occurs due to an access to the area unassigned with said physical address, wherein said variable setting unit sets the initial value of the variable in the area unassigned with said physical address during the page fault interrupt process.

3. The electronic apparatus according to claim 1, further comprising a physical address setting unit, which sets a physical address of the area set with the initial value of the variable, to said page table.

4. The electronic apparatus according to claim 1, wherein said program executing unit executes the program as a task having a low priority order.

5. An electronic apparatus for copying data of a program recorded in a first recording medium to a second recording medium to execute the program, comprising:
    a detecting unit, which detects an access to an uncopied area of said second recording medium where a copy from said first recording medium is not performed;
    a copying unit, which intercepting execution of the program when an access to the uncopied area is detected by said detecting unit, and copies the program corresponding to the uncopied area, from said first recording medium to the uncopied area of said second recording medium;
    a managing unit, which manages an area of said second recording medium which is a copy destination of data of the program copied by said copying unit; and
    an execution resuming unit, which resumes execution of said intercepted program after said managing unit manages the area of said second recording medium,
    wherein said managing unit has a register, and each bit of said register corresponds to a block having a constant size starting from a particular address of said second recording medium,
    wherein said detecting unit detects, by using a value of the bit of said register, that an address of the area of said second recording medium managed by said managing unit which address is an address of the uncopied area where data of the program is uncopied, is identical with an accessed address, and
    wherein said managing unit stores the identical address detected by said detecting unit.

6. The electronic apparatus according to claim 5, wherein at least one of a start address of an address indicating the area of the second recording medium managed by said managing unit and a start address of an address to be detected by said detecting unit is variable.

7. The electronic apparatus according to claim 6, wherein:
    said detecting unit includes a detection stop unit for stopping detection; and
    said detection stop unit stops the detection when the electronic apparatus is activated from a state that a power source is turned off.

8. The electronic apparatus according to claim 6, wherein said managing unit sets the area of the second recording medium to the uncopied area where a copy from said first recording medium is not performed, when the electronic apparatus is activated from a state that a power source is turned off.

9. The electronic apparatus according to claim 5, further comprising a state detecting unit, which detects an idle state in which there is no effective program to be executed, wherein said copying unit copies data of the program corresponding to the uncopied area, from said first recording medium to the uncopied area of said second recording medium, when said state detecting unit detects the idle state.

10. The electronic apparatus according to claim 5, wherein the program is an application program.

11. A data processing method of executing a program by using a page table for managing, on a page unit basis, virtual and physical addresses of the program, comprising:
    an initializing step of setting said page table in such a manner that a physical address is unassigned to an area of a variable of the program and initializing said page table;
    a program executing step of executing the program after said page table is initialized in said initializing step; and
    a variable setting step of setting, when an area unassigned with said physical address is accessed during execution of the program in said program executing step, an initial value of the variable in the area,
    wherein said initializing step sets said page table in such a manner that physical addresses of a data segment area and a BSS area are unassigned and initializes said page table, and
    wherein if the area unassigned with said physical address is the BSS area, said variable setting step sets 0 as the initial value of the variable in the area, whereas if the area unassigned with said physical address is the data segment area, said variable setting step reads the initial value of the variable from a predetermined recording medium and sets the read initial value as the initial value of the variable.

12. A data processing method of copying data of a program recorded in a first recording medium to a second recording medium to execute the program, comprising:
    a detecting step of detecting an access to an uncopied area of said second recording medium where a copy from said first recording medium is not performed;
    a copying step of intercepting execution of the program when an access to the uncopied area is detected in said detecting step, and copying the program corresponding to the uncopied area, from said first recording medium to the uncopied area of said second recording medium;
    a managing step of managing an area of said second recording medium which is a copy destination of data of the program copied in said copying step; and
    an execution resuming step of resuming execution of said intercepted program after said managing step manages the area of said second recording medium,
    wherein said managing step manages the area with a register, and each bit of said register corresponds to a block having a constant size starting from a particular address of said second recording medium,
    wherein said detecting step detects, by using a value of the bit of said register, that an address of the area of said second recording medium managed in said managing step which address is an address of the uncopied area where data of the program is uncopied, is identical with an accessed address, and
    wherein said managing step stores the identical address detected in said detecting step.

13. A computer program stored on a computer-readable storage medium for causing a computer to execute a control method by using a page table for managing, on a page unit basis, virtual and physical addresses of a program, said control method comprising:
    an initializing step of setting said page table in such a manner that a physical address is unassigned to an area of a variable of the program and initializing said page table;
    a program executing step of executing the program after said page table is initialized in said initializing step; and
    a variable setting step of setting, when an area unassigned with said physical address is accessed during execution of the program in said program executing step, an initial value of the variable in the area, wherein said initializing step sets said page table in such a manner that physical addresses of a data segment area and a BSS area are unassigned and initializes said page table, and wherein if the area unassigned with said physical address is the BSS area, said variable setting step sets 0 as the initial value of the variable in the area, whereas if the area unassigned with said physical address is the data segment area, said variable setting step reads the initial value of the variable from a predetermined recording medium and sets the read initial value as the initial value of the variable.

14. A computer program stored on a computer-readable storage medium for causing a computer to execute a control method, said control method comprising:

for copying data of a program recorded in a first recording medium to a second recording medium and executing the program, a detecting step of detecting an access to an uncopied area of said second recording medium where a copy from said first recording medium is not performed;

a copying step of intercepting execution of the program when an access to the uncopied area is detected in said detecting step, and copying the program corresponding to the uncopied area, from said first recording medium to the uncopied area of said second recording medium;

a managing step of managing an area of said second recording medium which is a copy destination of data of the program copied in said copying step; and an execution resuming step of resuming execution of said intercepted program after said managing step manages the area of said second recording medium, wherein said managing step manages the area with a register, and each bit of said register corresponds to a block having a constant size starting from a particular address of said second recording medium, wherein said detecting step detects, by using a value of the bit of said register, that an address of the area of said second recording medium managed in said managing step which address is an address of the uncopied area where data of the program is uncopied, is identical with an accessed address, and wherein said managing step stores the identical address detected in said detecting step.

* * * * *